(12) United States Patent
Chernyakova et al.

(10) Patent No.: US 11,774,581 B2
(45) Date of Patent: Oct. 3, 2023

(54) SYSTEMS AND METHODS FOR IMAGING A CONCEALED SURFACE

(71) Applicant: VAYYAR IMAGING LTD., Yehud (IL)

(72) Inventors: Tanya Chernyakova, Tel Aviv (IL); Omer Gal, Tel Aviv (IL); Assaf Kartowsky, Tel Aviv (IL); Shay Moshe, Petach-Tikva (IL)

( * ) Notice: Subject to any disclaimer, the term of this patent is extended or adjusted under 35 U.S.C. 154(b) by 0 days.

(21) Appl. No.: 18/015,727

(22) PCT Filed: Sep. 14, 2021

(86) PCT No.: PCT/IB2021/058379
§ 371 (c)(1),
(2) Date: Jan. 12, 2023

(87) PCT Pub. No.: WO2022/058891
PCT Pub. Date: Mar. 24, 2022

(65) Prior Publication Data
US 2023/0213645 A1    Jul. 6, 2023

Related U.S. Application Data

(60) Provisional application No. 63/212,740, filed on Jun. 21, 2021, provisional application No. 63/078,337, (Continued)

(51) Int. Cl.
*G01S 13/88* (2006.01)
*G01S 7/02* (2006.01)
(Continued)

(52) U.S. Cl.
CPC ............ *G01S 13/887* (2013.01); *G01S 7/027* (2021.05); *G01S 7/064* (2013.01); *G01S 7/20* (2013.01);
(Continued)

(58) Field of Classification Search
CPC ........ G01S 13/887; G01S 7/027; G01S 7/064; G01S 7/20; G01S 2013/0245;
(Continued)

(56) References Cited

U.S. PATENT DOCUMENTS 4,829,306 A * 5/1989 Gjessing ................. G01S 13/90
342/159
5,363,050 A * 11/1994 Guo ....................... G01N 22/00
73/620

(Continued)

OTHER PUBLICATIONS

D. Blacknell, D. Muff, M. Nottingham and C. Stevenson, "Radar Automatic Target Recognition Based on Disjoint Multi-Static K-Space Coverage," 2018 International Conference on Radar (RADAR), Brisbane, QLD, Australia, 2018, pp. 1-5, doi: 10.1109/RADAR.2018.8557271. (Year: 2018).*

(Continued)

*Primary Examiner* — Bernarr E Gregory
(74) *Attorney, Agent, or Firm* — ALPHAPATENT ASSOCIATES, LTD; Daniel J. Swirsky

(57) ABSTRACT

Radar systems and methods for imaging surfaces. A processor receives raw data from the radar and executes an image data generation. A display unit displays an image representing the targeted surface. The radar unit may be incorporated in a handheld scanner. Rectangular antenna arrays may be configured and processors may be operable such that the image data generated may be processed and displayed in real time.

20 Claims, 17 Drawing Sheets

Related U.S. Application Data filed on Sep. 15, 2020, provisional application No. 63/078,336, filed on Sep. 15, 2020, provisional application No. 63/078,341, filed on Sep. 15, 2020, provisional application No. 63/078,342, filed on Sep. 15, 2020, provisional application No. 63/078,339, filed on Sep. 15, 2020.

(51) Int. Cl.
*G01S 7/06* (2006.01)
*G01S 7/20* (2006.01)
*G01S 13/02* (2006.01)
*G01S 13/46* (2006.01)

(52) U.S. Cl.
CPC . *G01S 2013/0245* (2013.01); *G01S 2013/468* (2013.01)

(58) Field of Classification Search
CPC ............... G01S 2013/468; G01S 13/90; G01R 33/4824; G01N 22/00; G01N 29/11
See application file for complete search history.

(56) References Cited

U.S. PATENT DOCUMENTS

| | | | | |
|---|---|---|---|---|
| 7,124,044 B2* | 10/2006 | Witten | ................... | G01N 29/11 |
| | | | | 702/77 |
| 2007/0014486 A1* | 1/2007 | Schiwietz | .......... | G01R 33/4824 |
| | | | | 382/128 |
| 2007/0122060 A1 | 5/2007 | Hardy et al. | | |
| 2007/0249929 A1 | 10/2007 | Jeong et al. | | |
| 2010/0295725 A1* | 11/2010 | Krozer | ................... | G01S 13/887 |
| | | | | 342/25 A |
| 2012/0288137 A1 | 11/2012 | Daly et al. | | |
| 2012/0299773 A1 | 11/2012 | Stirling-Gallacher et al. | | |
| 2014/0077989 A1* | 3/2014 | Healy, Jr. | ................ | G01S 13/90 |
| | | | | 342/25 F |
| 2018/0196135 A1 | 7/2018 | Crain et al. | | |

OTHER PUBLICATIONS

G. Halcrow and B. Mulgrew, "Nonlinear k-space mapping method for SAR Fourier imaging," 2006 IEEE Conference on Radar, Verona, NY, USA, 2006, pp. 4 pp.-, doi: 10.1109/RADAR.2006.1631828. (Year: 2006).*

H.-T. Tran and R. Melino, "The Slow-Time k-Space of Radar Tomography and Applications to High-Resolution Target Imaging," in IEEE Transactions on Aerospace and Electronic Systems, vol. 54, No. 6, pp. 3047-3059, Dec. 2018, doi: 10.1109/TAES.2018.2840279. (Year: 2018).*

I. Stojanovic, M. Çetin and W. C. Karl, "Compressed Sensing of Monostatic and Multistatic SAR," in IEEE Geoscience and Remote Sensing Letters, vol. 10, No. 6, pp. 1444-1448, Nov. 2013, doi: 10.1109/LGRS.2013.2259794. (Year: 2013).*

Zhuravlev et al. "Imaging of concealed objects on moving persons by creating synthetic aperture due to their natural motion" 2017 IEEE international Conference on Microwaves, Antennas, Communications and Electronic Systems (COMCAS). IEEE, Nov. 13, 2017 (Nov. 13, 2017) Retrieved on Dec. 13, 2021 (Dec. 13, 2021) from <https://ieeexplore.ieee.org/abstracUdocumenU8244743>.

* cited by examiner

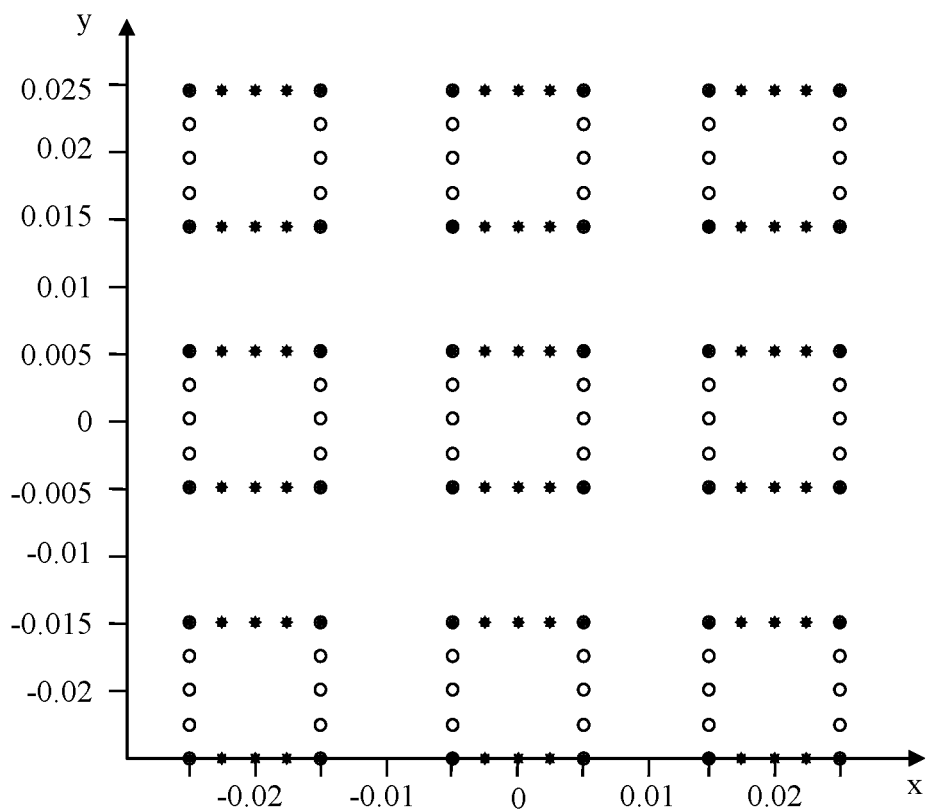
Fig. 6B
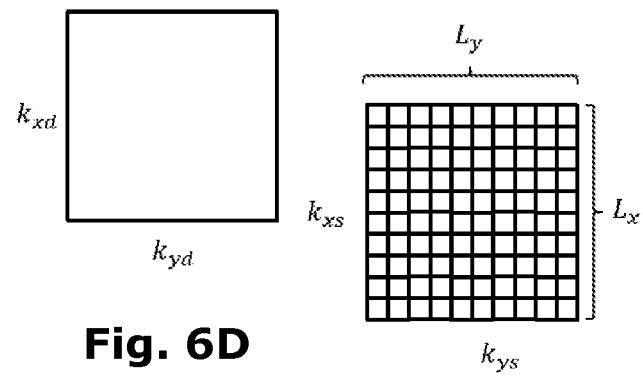
Fig. 6D
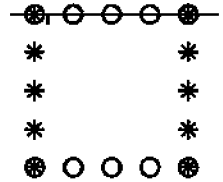
$$f_{s,sparse} = \frac{1}{La}$$
$$f_{s,dense} = \frac{1}{a}$$
Fig. 6C
$k_{xs}^s$ $\square$
$k_{ys}^s$
Fig. 6E

φ

| $r_{max11}$ | $r_{max12}$ | $r_{max13}$ | $r_{max14}$ | $r_{max15}$ | $r_{max16}$ | $r_{max17}$ |
|---|---|---|---|---|---|---|
| $r_{max21}$ | $r_{max22}$ | $r_{max23}$ | $r_{max24}$ | $r_{max25}$ | $r_{max26}$ | $r_{max27}$ |
| $r_{max31}$ | $r_{max32}$ | $r_{max33}$ | $r_{max34}$ | $r_{max35}$ | $r_{max36}$ | $r_{max37}$ |
| $r_{max41}$ | $r_{max42}$ | $r_{max43}$ | $r_{max44}$ | $r_{max45}$ | $r_{max46}$ | $r_{max47}$ |
| $r_{max51}$ | $r_{max52}$ | $r_{max53}$ | $r_{max54}$ | $r_{max55}$ | $r_{max56}$ | $r_{max57}$ |
| $r_{max61}$ | $r_{max62}$ | $r_{max63}$ | $r_{max64}$ | $r_{max65}$ | $r_{max66}$ | $r_{max67}$ |
| $r_{max71}$ | $r_{max72}$ | $r_{max73}$ | $r_{max74}$ | $r_{max75}$ | $r_{max76}$ | $r_{max77}$ |

θ (vertical axis label)

| $r_{med11}$ | $r_{med12}$ | $r_{med13}$ | $r_{med14}$ | $r_{med15}$ | $r_{med16}$ | $r_{med17}$ |
|---|---|---|---|---|---|---|
| $r_{med21}$ | $r_{med22}$ | $r_{med23}$ | $r_{med24}$ | $r_{med25}$ | $r_{med26}$ | $r_{med27}$ |
| $r_{med31}$ | $r_{med32}$ | $r_{med33}$ | $r_{med34}$ | $r_{med35}$ | $r_{med36}$ | $r_{med37}$ |
| $r_{med41}$ | $r_{med42}$ | $r_{med43}$ | $r_{med44}$ | $r_{med45}$ | $r_{med46}$ | $r_{med47}$ |
| $r_{med51}$ | $r_{med52}$ | $r_{med53}$ | $r_{med54}$ | $r_{med55}$ | $r_{med56}$ | $r_{med57}$ |
| $r_{med61}$ | $r_{med62}$ | $r_{med63}$ | $r_{med64}$ | $r_{med65}$ | $r_{med66}$ | $r_{med67}$ |
| $r_{med71}$ | $r_{med72}$ | $r_{med73}$ | $r_{med74}$ | $r_{med75}$ | $r_{med76}$ | $r_{med77}$ |

θ (vertical axis label)

Fig. 12B

SYSTEMS AND METHODS FOR IMAGING A CONCEALED SURFACE

CROSS-REFERENCE TO RELATED APPLICATIONS

This application is a U.S. National Phase Application under 35 U.S.C. 371 of International Application No. PCT/IB2021/058379, which has an international filing date of Sep. 14, 2021, which claims the benefit of priority from U.S. Provisional Patent Application No. 63/078,336, filed Sep. 15, 2020, U.S. Provisional Patent Application No. 63/078,337, filed Sep. 15, 2020, U.S. Provisional Patent Application No. 63/078,339, filed Sep. 15, 2020, U.S. Provisional Patent Application No. 63/078,341, filed Sep. 15, 2020, U.S. Provisional Patent Application No. 63/078,342, filed Sep. 15, 2020, and U.S. Provisional Patent Application No. 63/212,740, filed Jun. 21, 2021 the contents of which are incorporated by reference in their entirety.

FIELD OF THE DISCLOSURE

The disclosure herein relates to systems and methods for systems and methods for imaging a concealed surface covered by an opaque outer layer. In particular the disclosure relates to radar imaging at short range.

BACKGROUND

Object scanning, such as security scanning, is commonly carried out using a metal detector which is capable of detecting the presence of metallic objects concealed beneath clothing, within packages or other opaque outer layers. Metal detectors are convenient as they may be mounted in frames or handheld scanning devices. However metal detectors only detect metallic objects, furthermore they do not typically provide imaging data to indicate the shape or nature of the object detected.

Various imaging methods are known, such as x-ray devices which may be used to image objects concealed behind opaque outer layers. X-rays of various energy levels may be used to detect various types of objects. However, x-rays are harmful to health and x-ray devices are large and unwieldy. Consequently, x-rays devices are not suitable for handheld scanners.

SUMMARY OF THE EMBODIMENTS

According to one aspect of the presently disclosed subject matter, a method is hereby taught for generating a radar image of an object at close range from a two dimensional array of antennas. The method may include: providing a display device; providing an array of transmitting antennas and receiving antennas arranged in a matrix of rectangular frames spaced at regular intervals; each of said transmitting antennas transmitting a radio signal into a target region; each of said receiving antennas receiving a radio signal reflected by an object within the target region; generating image data and adjusting the display device to represent the image signal.

The image may be generated, where required by: for each receiver-transmitter pair generating a five dimensional S-parameter $s(x_t, y_t, x_r, y_r, k)$; performing a four dimensional Fourier transform on the five dimensional S-parameter signal $s(x_t, y_t, x_r, y_r, k)$, thereby generating a five dimensional k-space signal $S(k_{xt}, k_{yt}, k_{xr}, k_{yr}, k)$; mapping the five dimensional k-space signal $S(k_{xt}, k_{yt}, k_{xr}, k_{yr}, k)$ to a three dimensional image k-space signal $I(k_x, k_y, k_z)$; and performing an inverse Fourier transform thereby generating the image signal $I(x, y, z)$.

Optionally, the method further comprises recording the scanning device's own location thereby providing a reference position for antennas transmitting signals are receiving reflected signals are received. For example, the method may involve triangulating the location of the radar unit.

Where appropriate, the method may include providing a radar unit comprising at least one transmitter antenna connected to an oscillator and at least one receiver antenna; providing a movable casing unit encasing the radar unit; and passing the movable casing over the target region.

Optionally, the step of performing a four dimensional Fourier transform on the five dimensional 5-parameter signal comprises: selecting a spatial period equal to the interval between rectangular frames; and sampling the RX-TX pairs in regular steps.

For example each rectangular frame comprises two parallel lines of equally spaced transmitters forming a first pair sides of a rectangle and two parallel lines of equally spaced receivers forming an orthogonal pair of sides of the rectangle.

Variously, the step of mapping the five dimensional k-space signal may further comprise: generating an intermediate image signal $I(k_x, k_y, \hat{k}_z)$ and interpolating $\hat{k}_z \rightarrow k_z$, where $$k_x = k_{xt} + k_{xr}, k_y = k_{yt} + k_{yr}, \text{ and } \hat{k}_z = \sqrt{k^2 - k_{xt}^2 - k_{yt}^2} + \sqrt{k^2 - k_{xr}^2 - k_{yr}^2}.$$

Additionally or alternatively, the step of mapping the five dimensional k-space signal may comprise selecting a required accuracy for the $\hat{k}_z$ value; and clustering values of $S(k_{xt}, k_{yt}, k_{xr}, k_{yr}, k)$ into bins having the same $\hat{k}_z$ values.

Again, additionally or alternatively, the step of mapping the five dimensional k-space signal may comprise processing two dimensional slices $I_{kx}(k_y, \hat{k}_z)$ of the intermediate image signal $I(k_x, k_y, \hat{k}_z)$ or processing one dimensional slices $I_{k_x,k_y}(\hat{k}_z)$ of the intermediate image signal $I(k_x, k_y, \hat{k}_z)$.

In certain examples, the step of generating image data comprises: generating a three dimensional image of the target region comprising a three dimensional array of voxels, each voxel being characterized by a first coordinate, a second coordinate, a third coordinate and an associated value of amplitude of energy reflected from those coordinates; and constructing an image matrix comprising a two dimensional array of pixels by selecting a unique energy value for each pixel characterized by the first coordinate, and the second coordinate.

Such a unique energy value may be selected by: for each pair of first coordinate and second coordinate, identifying a maximum voxel with an energy value higher than all other voxels sharing the same pair of first coordinate and second coordinate; constructing a two dimensional max-voxel matrix wherein each cell is characterized by a pair of first coordinate and second coordinate and assigned a value associated with the third coordinate of the maximum voxel for that pair; constructing a two dimensional med-value matrix wherein each cell is characterized by a pair of first coordinate and second coordinate and assigned a value equal to the median of all values of cells adjacent to the corresponding cell in the max-voxel matrix; selecting an energy level for each pixel of the image matrix which is equal to the energy value of the voxel characterized by: the first coordinate of the pixel, the second coordinate of the pixel, and the third coordinate equal to the value of the corresponding cell in the med-value matrix. Variously, the first coordinate, the second coordinate and the third coordinate comprise a set of cartesian coordinates (x, y, z), a set of cylindrical coordinates (ρ, φ, z), a set of spherical coordinates (r, θ, φ) or the like.

According to another aspect of the presently disclosed subject matter, a scanning device is introduced for imaging a surface within a target region, the device comprising: a radar unit comprising an array of transmitting antennas and receiving antennas arranged in a matrix of rectangular frames spaced at regular intervals; an oscillator connected to said transmitting antennas; a processor unit configured to receive raw data from the radar unit and operable to generate image data based upon the raw data a memory unit configured and operable to store the image data; and a display configured and operable to display an image representing the surface. Optionally, the radar unit is encased within a movable casing unit. Such a scanning device may have a movable casing unit with dimensions suitable for use as a hand-held scanner.

Where required, the device may include a registration mechanism configured and operable to record the scanning device's own location thereby providing a reference position for antennas transmitting signals are receiving reflected signals are received. For example, the registration mechanism comprises a set of fixed reference beacons. Accordingly, the processor unit may be operable to triangulate the location of the radar unit.

BRIEF DESCRIPTION OF THE FIGURES

For a better understanding of the embodiments and to show how it may be carried into effect, reference will now be made, purely by way of example, to the accompanying drawings.

With specific reference now to the drawings in detail, it is stressed that the particulars shown are by way of example and for purposes of illustrative discussion of selected embodiments only, and are presented in the cause of providing what is believed to be the most useful and readily understood description of the principles and conceptual aspects. In this regard, no attempt is made to show structural details in more detail than is necessary for a fundamental understanding; the description taken with the drawings making apparent to those skilled in the art how the various selected embodiments may be put into practice. In the accompanying drawings:

FIGS. 6B and 6C indicate a possible arrangement of radar antennas in rectangular frames spaced at regular intervals;

FIGS. 6D and 6E indicates an alternative sampling rate used in the method.

FIG. 12A illustrates a possible r-max matrix used in the construction of a two dimensional image according to some embodiments;

FIG. 12B illustrates a possible r-med matrix used in the construction of a two dimensional image according to some embodiments.

DETAILED DESCRIPTION

Figure 1:
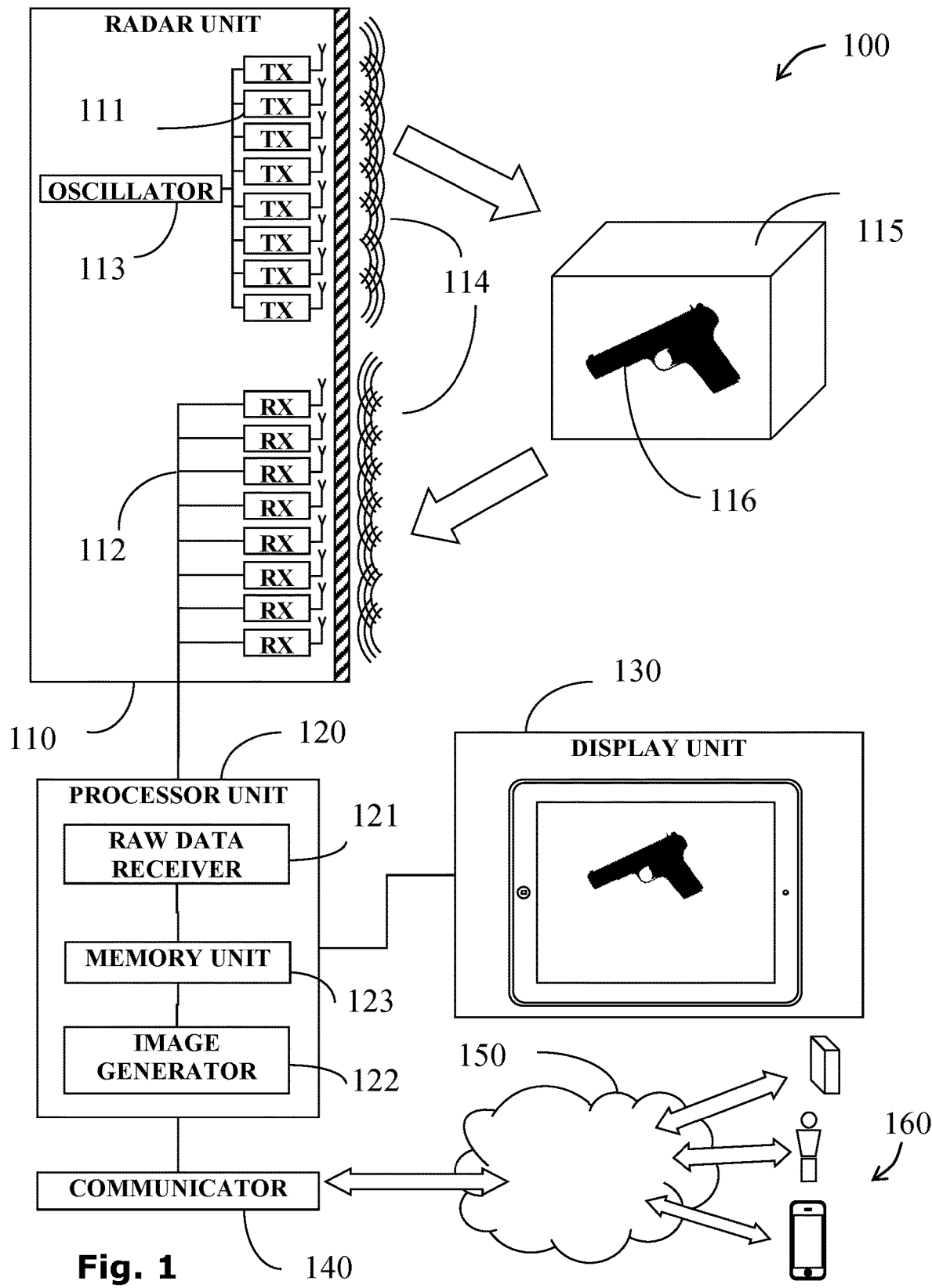
FIG. 1 schematically represents elements of a system for imaging a concealed surface covered by an opaque outer layer.

Aspects of the present disclosure relate to system and methods for generating a radar image of an object at close range from a two dimensional array of antennas. The method may comprises providing a display device; providing an array of transmitting antennas and receiving antennas arranged in a matrix of rectangular frames spaced at regular intervals; each of said transmitting antennas transmitting a radio signal into a target region; each of said receiving antennas receiving a radio signal reflected by an object within the target region; and generating image data and adjusting the display device to represent the image signal.

The image data may be generated by: for each receiver-transmitter pair generating a five dimensional S-parameter $s(x_t, y_t, x_r, y_r, k)$; performing a four dimensional Fourier transform on the five dimensional S-parameter signal $s(x_t, y_t, x_r, y_r, k)$, thereby generating a five dimensional k-space signal $S(k_{xt}, k_{yt}, k_{xr}, k_{yr}, k)$; mapping the five dimensional k-space signal $S(k_{xt}, k_{yt}, k_{xr}, k_{yr}, k)$ to a three dimensional image k-space signal $I(k_x, k_y, k_z)$; and performing an inverse Fourier transform thereby generating the image signal $I(x, y, z)$.

Optionally, the method may further comprise recording the scanning device's own location thereby providing a reference position for antennas transmitting signals are receiving reflected signals are received. For example the scanning device may triangulate the location of the radar unit.

Where appropriate, the method includes providing a radar unit comprising at least one transmitter antenna connected to an oscillator and at least one receiver antenna; providing a movable casing unit encasing the radar unit; and passing the movable casing over the target region.

The step of performing a four dimensional Fourier transform on the five dimensional S-parameter signal may comprise: selecting a spatial period equal to the interval between rectangular frames; and sampling the RX-TX pairs in regular steps. Optionally, each rectangular frame comprises two parallel lines of equally spaced transmitters forming a first pair sides of a rectangle and two parallel lines of equally spaced receivers forming an orthogonal pair of sides of the rectangle.

Variously, the step of mapping the five dimensional k-space signal may comprise generating an intermediate image signal $I(k_x, k_y, \hat{k}_z)$ and interpolating $\hat{k}_z \to k_z$ where:

$$k_x = k_{xt} + k_{xr}, k_y = k_{yt} + k_{yr}, \text{ and } \hat{k}_z = \sqrt{k^2 - k_{xt}^2 - k_{yt}^2} + \sqrt{k^2 - k_{xr}^2 - k_{yr}^2};$$

Additionally or alternatively, the step of mapping the five dimensional k-space signal may comprise selecting a required accuracy for the $\hat{k}_z$ value; and clustering values of $S(k_{xt}, k_{yt}, k_{xr}, k_{yr}, k)$ into bins having the same $\hat{k}_z$ values.

Again, additionally or alternatively, the step of mapping the five dimensional k-space signal may comprise processing two dimensional slices $I_{k_x}(k_y, \hat{k}_z)$ of the intermediate image signal $I(k_x, k_y, \hat{k}_z)$ or processing one dimensional slices $I_{k_x,k_y}(\hat{k}_z)$ of the intermediate image signal $I(k_x, k_y, \hat{k}_z)$.

Optionally, the step of generating image data comprises: generating a three dimensional image of the target region comprising a three dimensional array of voxels, each voxel being characterized by a first coordinate, a second coordinate, a third coordinate and an associated value of amplitude of energy reflected from those coordinates; and constructing an image matrix comprising a two dimensional array of pixels by selecting a unique energy value for each pixel characterized by the first coordinate, and the second coordinate.

Accordingly, for each pair of first coordinate and second coordinate, the method may involve identifying a maximum voxel with an energy value higher than all other voxels sharing the same pair of first coordinate and second coordinate; constructing a two dimensional max-voxel matrix wherein each cell is characterized by a pair of first coordinate and second coordinate and assigned a value associated with the third coordinate of the maximum voxel for that pair; constructing a two dimensional med-value matrix wherein each cell is characterized by a pair of first coordinate and second coordinate and assigned a value equal to the median of all values of cells adjacent to the corresponding cell in the max-voxel matrix; selecting an energy level for each pixel of the image matrix which is equal to the energy value of the voxel characterized by the first coordinate of the pixel, the second coordinate of the pixel, and the third coordinate equal to the value of the corresponding cell in the med-value matrix. Variously, the first coordinate, the second coordinate and the third coordinate comprise a set of cartesian coordinates $(x, y, z)$, a set of cylindrical coordinates $(\rho, \varphi, z)$, a set of spherical coordinates $(r, \theta, \varphi)$ or the like.

Aspects of the present disclosure relate to system and methods for imaging a surface within a target region, the device may include various components such as a radar unit, comprising an array of transmitting antennas and receiving antennas arranged in a matrix of rectangular frames spaced at regular intervals, an oscillator connected to said transmitting antennas; a processor unit configured to receive raw data from the radar unit and operable to generate image data based upon the raw data, and a display configured and operable to display an image representing the surface. Optionally, the radar unit is encased within a movable casing unit. Such a device may be encased in a movable casing unit has dimensions suitable for use as a hand-held scanner.

Where required the scanning device may include a registration mechanism configured and operable to record the scanning device's own location thereby providing a reference position for antennas transmitting signals are receiving reflected signals are received. For example the registration mechanism comprises a set of fixed reference beacons which may be operable to triangulate the location of the radar unit.

Aspects of the present disclosure relate to systems and methods for radar imaging of concealed surfaces covered by an opaque outer layer. Radar imaging devices may be used in a variety of applications where an outer layer obscures an image.

In one example of a homeland security application it is often necessary to scan individuals to make sure that they do not carry concealed weapons so as to provide security clearance. Similarly it may be useful to scan packages to ascertain the contents thereof represent a security threat.

In another application, clothes fitters may use a radar device to measure the body shape and dimensions of a clothed individual. If is particularly noted that radar imaging is particularly useful in the case of body imaging as, although images may be generated and measurements may be taken, the resolution of the generated images is not typically high enough to impinge upon an individual's privacy.

Still other applications may include scientific investigations, mining, tunnel detection, prospecting, archeology and the like. It is particularly noted that the imaging of archeological artifacts such as mummies, coffins and sarcophagi often requires large and costly medical equipment such as CT scanners and MRI units. A convenient portable radar imager may allow for faster and more convenient analysis of archeological artifacts in situ.

As required, detailed embodiments of the present invention are disclosed herein; however, it is to be understood that the disclosed embodiments are merely examples of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As appropriate, in various embodiments of the disclosure, one or more tasks as described herein may be performed by a data processor, such as a computing platform or distributed computing system for executing a plurality of instructions. Optionally, the data processor includes or accesses a volatile memory for storing instructions, data or the like. Additionally or alternatively, the data processor may access a non-volatile storage, for example, a magnetic hard disk, flash-drive, removable media or the like, for storing instructions and/or data.

It is particularly noted that the systems and methods of the disclosure herein may not be limited in its application to the details of construction and the arrangement of the components or methods set forth in the description or illustrated in the drawings and examples. The systems and methods of the disclosure may be capable of other embodiments, or of being practiced and carried out in various ways and technologies.

Alternative methods and materials similar or equivalent to those described herein may be used in the practice or testing of embodiments of the disclosure. Nevertheless, particular methods and materials described herein for illustrative purposes only. The materials, methods, and examples not intended to be necessarily limiting. Accordingly, various embodiments may omit, substitute, or add various procedures or components as appropriate. For instance, the methods may be performed in an order different from described, and that various steps may be added, omitted or combined. In addition, aspects and components described with respect to certain embodiments may be combined in various other embodiments.

Reference is now made to FIG. 1 which schematically represents various elements of a system 100 for imaging a concealed surface 116 covered by an opaque outer layer 115 according to the current disclosure.

The scanning device includes a radar unit 110, a processor 120, a display unit 130 and a communicator 140. The radar unit 110 includes at least one transmitter antenna 111 and at least one receiver antenna 112. The transmitter 111 is connected to an oscillator 113 and configured to transmit electromagnetic waves 114 through the opaque outer layer 115 towards the concealed surface 116 therebehind. The receiver 112 is configured to receive electromagnetic waves 114 reflected by the concealed surface 116 and is operable to generate raw data.

The processor unit 120 is includes a receiver 121 configured to receive raw data from the radar unit 110 and operable to execute an image data generation function to generate image data based upon the received data. A memory unit 123 is provided to store the image data thus generated and an image generator 122 may be operable to convert the image data into a displayable image. Accordingly, the display unit 130 is configured and operable to present an array of pixels displaying an image representing the concealed surface 116.

The radar 110 typically includes at least one array of radio frequency transmitter antennas 111 and at least one array of radio frequency receiver antennas 112. The radio frequency transmitter antennas 111 are connected to an oscillator 113 (radio frequency signal source) and are configured and operable to transmit electromagnetic waves 114 towards the target region. The radio frequency receiver antennas 112 are configured to receive electromagnetic waves 114 reflected back from objects within the target region.

Accordingly the transmitter 111 may be configured to produce a beam of electromagnetic radiation 114, such as microwave radiation or the like, directed towards a monitored region such as an enclosed room or the like. The receiver may include at least one receiving antenna or array of receiver antennas 112 configured and operable to receive electromagnetic waves reflected by objects within the monitored region.

In order for the concealed inner layer 116 to be rendered visible, it is a particular feature of the current disclosure that the frequency of transmitted radiation is selected such that the outer layer 115 is transparent to the transmitted radiation and the reflected radiation which pass therethrough.

The raw data generated by the receivers 112 is typically a set of magnitude and phase measurements corresponding to the waves scattered back from the objects in front of the array. Spatial reconstruction processing is applied to the measurements to reconstruct the amplitude (scattering strength) at the three dimensional coordinates of interest within the target region. Thus each three dimensional section of the volume within the target region may represented by a voxel defined by four values corresponding to an x-coordinate, a y-coordinate, a z-coordinate, and an amplitude value.

The communication module 140 is configured and operable to communicate information to third parties 160. Optionally the communication module 140 may be in communication with a computer network such as the internet 150 via which it may communicate alerts to third parties for example via telephones, computers, wearable devices or the like 160.

Figure 2:
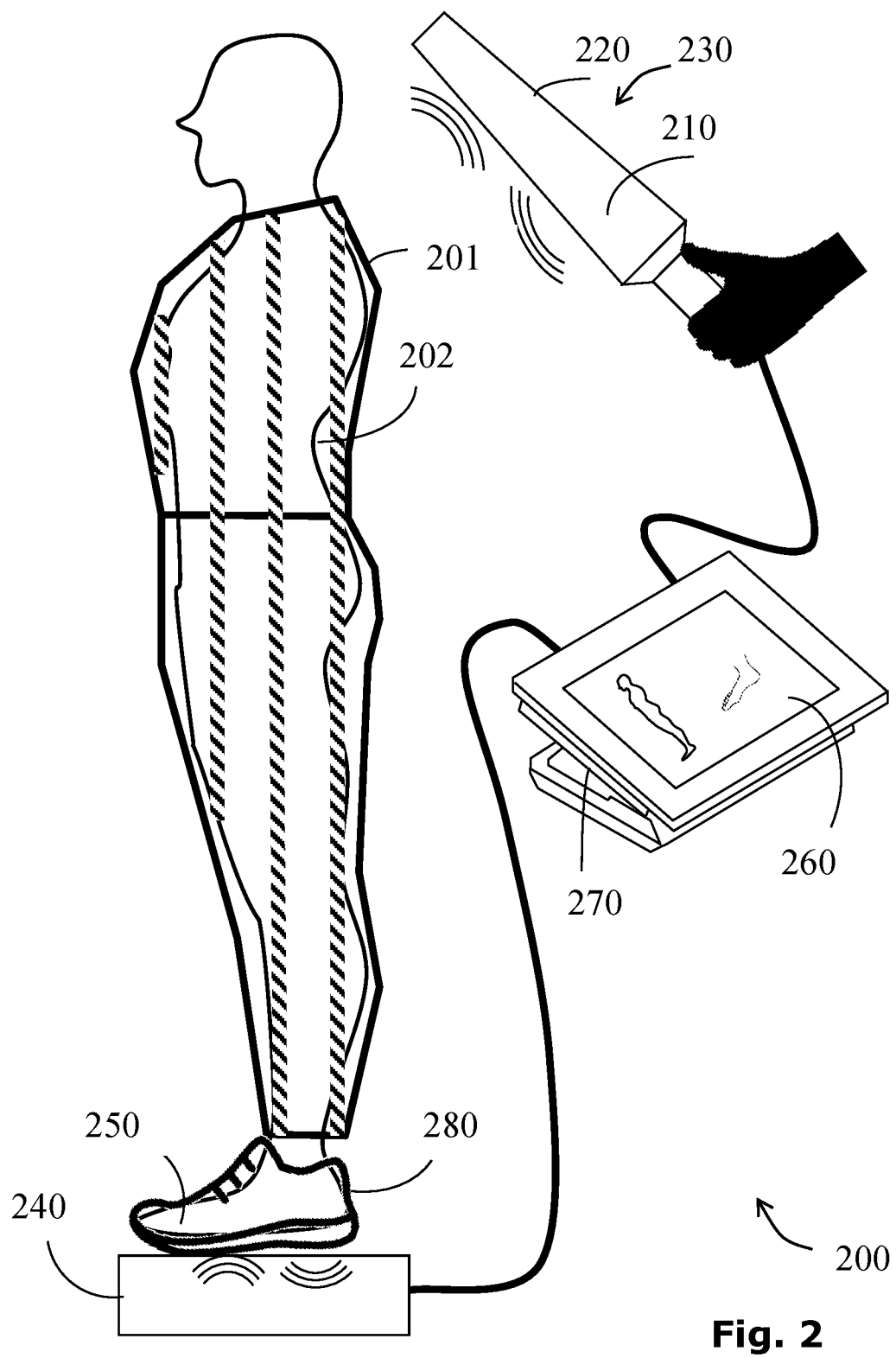
FIG. 2 schematically represents a possible system for imaging surfaces concealed beneath clothing of an individual.

Referring now to FIG. 2, a possible application of the system 200 is illustrated which may be used for imaging surfaces 202 concealed beneath clothing 201 of an individual. The transmitter and receiver of a first radar unit 210 are encased within a movable casing unit 220. This may allow the first radar unit 210 to have dimensions suitable for use as a hand-held scanner 230. For security applications, it may be useful to incorporate secondary sensing units within the movable case 220 such as a metal detector unit, an infrared detector unit, an ultrasound unit and the like. This may assist in the detection of concealed weapons.

Additionally or alternatively, a transmitter and receiver of a second radar unit 240 may be encased in an underfoot unit 240. This underfoot scanner 240 may enable the imaging of surfaces 250 concealed within the shoes 280 of the individual.

A display unit 260 may be provided which communicates with the radar units by wire or by wireless communication as required. The display unit 260 may be a tablet computing device. It is further noted that in other embodiments (not shown) the radar unit itself may be embedded within a tablet computing device.

It is particularly note that because a movable device 230 is not fixed in space, in some embodiments, the system may further include a registration mechanism 270 configured and operable to record the location of the scanning device as it is moved around the outer surface being. The registration mechanism 270 may thus provide a reference position at which each antenna transmits and receives a signal. By knowing the location of the antennas at the point of transmission and reception, a three dimensional map of the concealed surface may be reconstructed.

By way of example, the registration mechanism 270 may include a set of fixed reference beacons. Accordingly, the processor unit may be operable to triangulate the location of the radar unit from the location of the known beacons. Beacons may be active transmitters of a reference beam or alternatively may be fixed reflectors having characteristic reflective properties. Other registration mechanisms will occur to those skilled in the art. Among other methods, video cameras and inertial measurement units (IMU) can assist registering and tracking the motion of the scanning device. Furthermore, the video data can assist with identifying the exterior contour of the object, through which the concealed object is to be detected. Furthermore, acquiring data from more than a single location of the scanning device, the spatial resolution may be further augmented by utilizing larger effective aperture and larger effective number of transmit-receive antenna position combinations.

Figure 3:
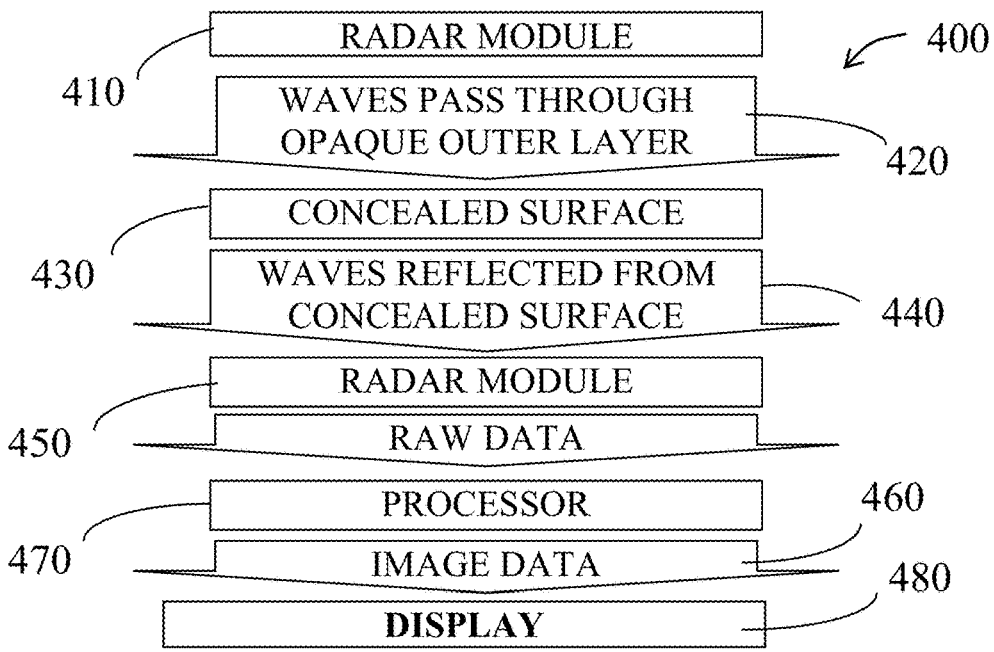
FIG. 3 is a flowchart indicating data flow through the system of imaging surfaces concealed beneath an outer layer.

Referring now to the flowchart of FIG. 3, which illustrates data flow through the system 400, the radar module 410 produces waves which pass through the opaque outer layer 420 to the concealed surfaces 430 therebehind. Waves reflected back through the concealed surface 430 are received by the radar unit 440 and raw data 450 is recorded thereby. The raw data may then be processed by the processor 460 to produce image data 470 which may be used by the display device 480 to construct and image.

Figure 4A:
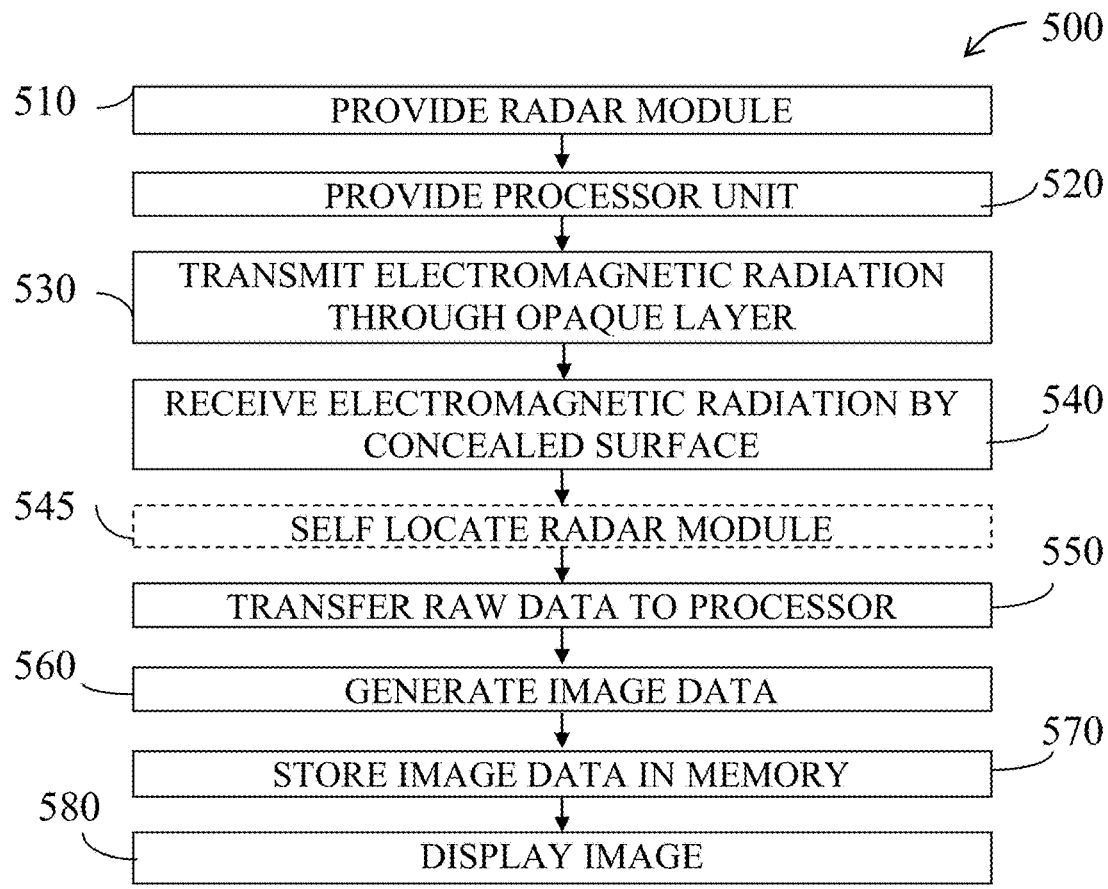
FIGS. 4A and 4B are flowcharts indicating selected steps of a method for processing of radar data and generating an image of the concealed surface.

Accordingly a method is taught for imaging a concealed surface covered by an opaque outer layer. With reference to FIG. 4A, the method 500 may include the steps of providing a radar unit 510 comprising at least one transmitter antenna connected to an oscillator and at least one receiver antenna; providing a processor unit 520; transmitting electromagnetic waves through the opaque outer layer 530 towards the concealed surface; receiving electromagnetic waves reflected by the concealed surface 540; transferring raw data to the processor 550; generating image data 560 based upon raw data received from the radar unit; storing the image data in a memory unit 570; and adjusting a display device to represent the concealed surface on a display 580.

Optionally, the method may further include self locating of the radar module 545 in order to record the scanning device's own location. The self location step may include triangulating the radar unit's position.

Figure 4B:
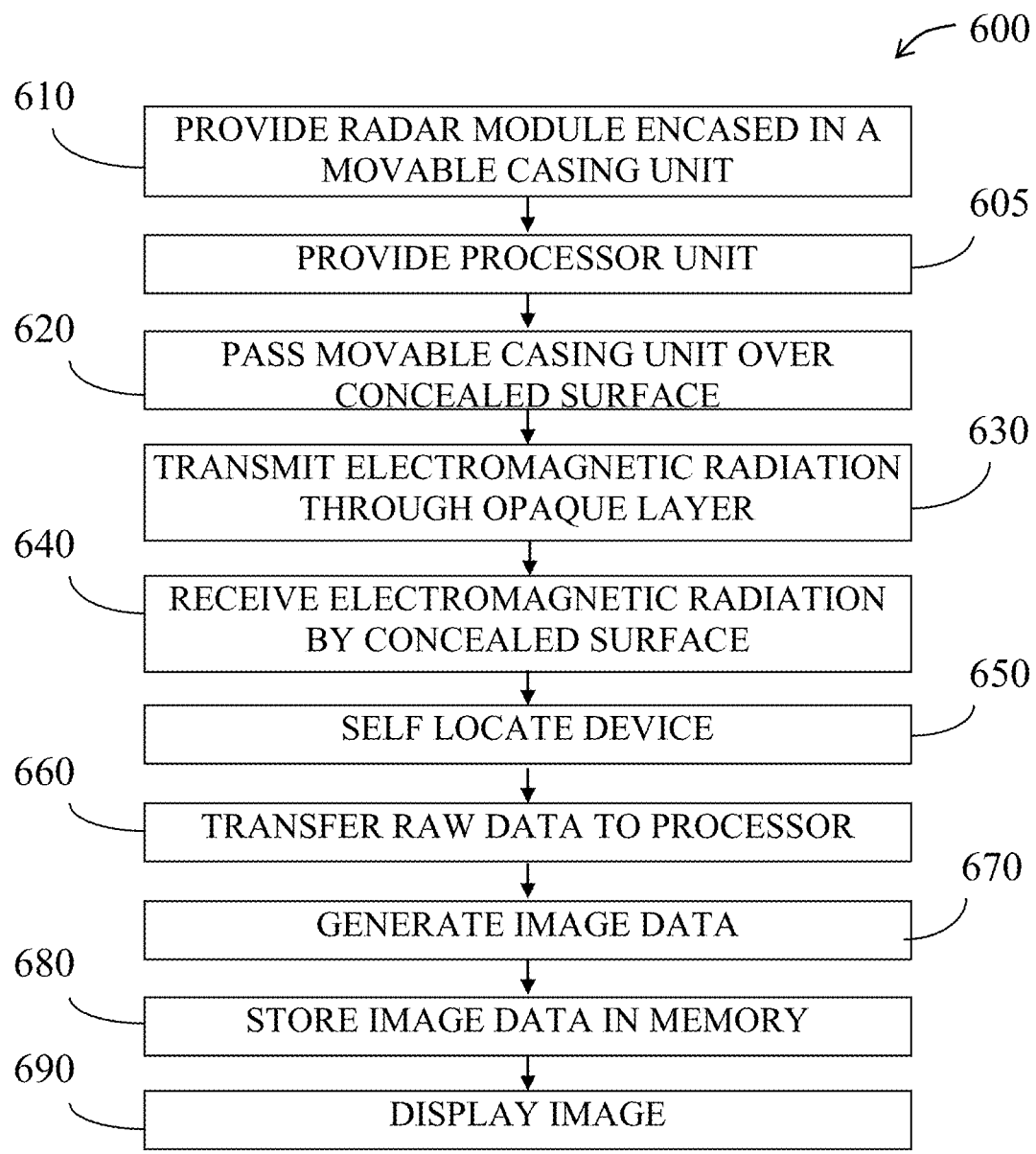

Referring now to the flowchart of FIG. 4B which illustrates how the method 600 may be adapted for use with a hand-held scanner by providing a radar unit comprising at least one transmitter antenna connected to an oscillator and at least one receiver antenna and providing a movable casing unit encasing the radar unit 610; providing a processing unit 605 and passing the movable casing over the concealed surface 620 while transmitting electromagnetic waves through the opaque outer layer 630 towards the concealed surface; receiving electromagnetic waves reflected by the concealed surface 640; self locating the radar unit 650; transferring raw data to the processor 660; generating image data based upon raw data received from the radar unit 670; storing the image data in a memory unit 680; and adjusting a display device to represent the concealed surface on a display 690.

It is noted that imaging objects within the near field of the radar unit requires particular care. When radiation is transmitted towards objects in the far field and reflected back therefrom, the path length of radiation between any two antennas within the array may be assumed to be equal, because the distances between the antennas in the array are negligible. This is not so for objects in the near field.

In the near field the distance between the object and the radar is of the same order as the distance between the antennas of the array. Accordingly, it is necessary to consider the path distance for each transmitter-receiver pair separately. Accordingly, for each point reflector in the near field, a set of values are generated for each antenna pair. This set of values may be represented by five dimensional S-parameters $S(x_t, y_t, x_r, y_r, k)$ where xt is the x coordinate of the transmitting antenna, $y_t$ is the y coordinate of the transmitting antenna, $x_r$ is the x coordinate of the receiving antenna, $y_r$ is the y coordinate of the receiving antenna, and $$k = \frac{2\pi f}{c}$$

is the wave number of the radiation of frequency f.

A complex target extending in three dimensions may be represented by an in image signal I(x,y,z). Accordingly, the five dimensional S-parameters $S(x_t, y_t, x_r, y_r, k)$ encode the data of the image signal thus:

$$s(x_t, y_t, x_r, y_r, k) = \int_x \int_y \int_z I(x,y,z) \cdot \exp(-jk\sqrt{(x_t-x)^2+(y_t-y)^2+z^2}) \exp(-jk\sqrt{(x_r-x)^2+(y_r-y)^2+z^2}) \cdot dx\, dy\, dz$$

Figure 5A:
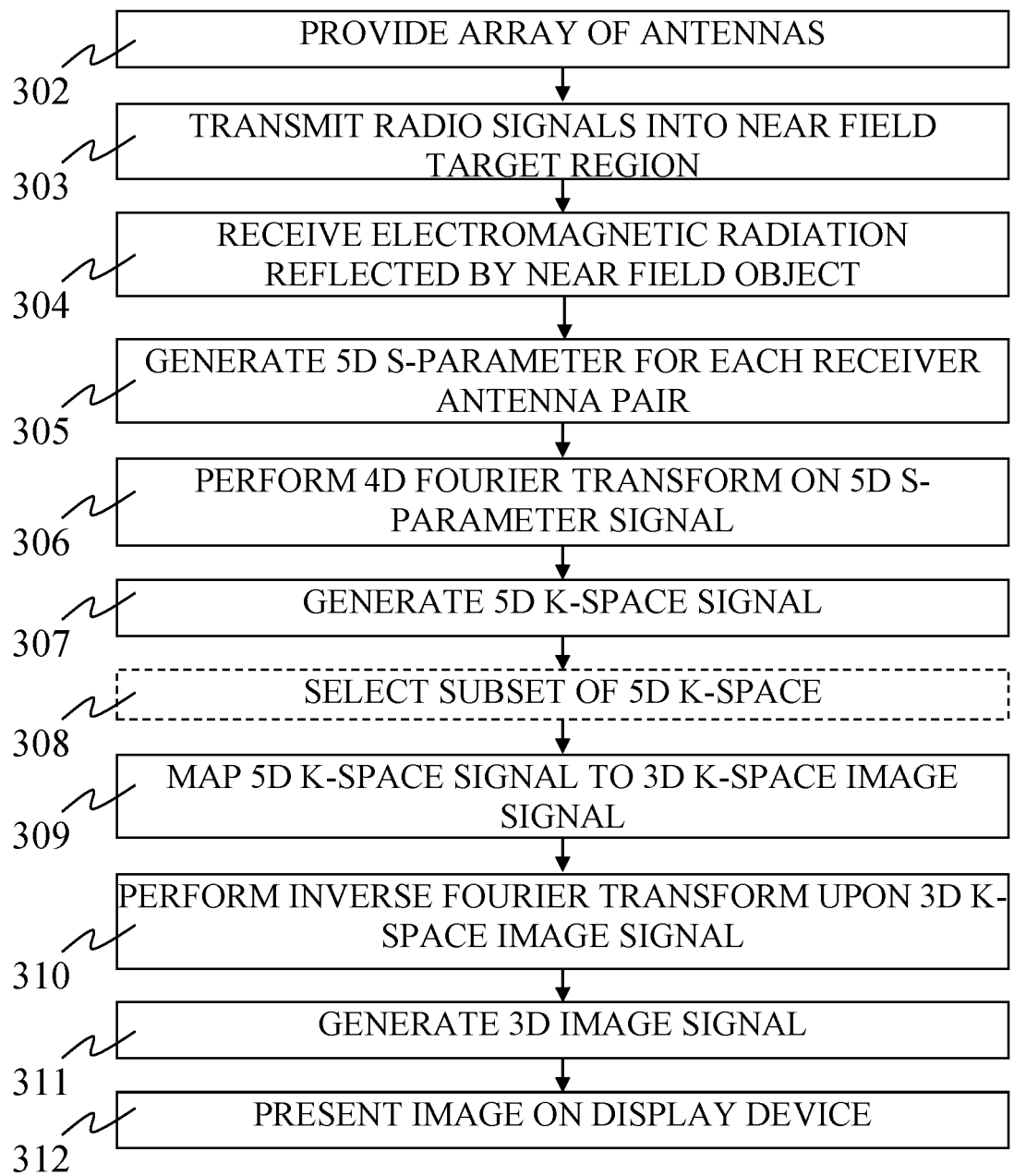
FIG. 5A is a flowchart indicating selected steps of a method for generating an image of an object in the near field from data collected by a radar antenna array.

Methods for recovering the image signal from the S-parameters are described herein. Reference is now made to the flowchart of FIG. 5A which presents selected steps of a method for generating an image of an object in the near field from data collected by a radar antenna array.

The method may include providing an array of antennas 302; each of the transmitting antennas transmitting a radio signal into a near field target region 303; each of the receiving antennas receiving a radio signal reflected by an object within the target region 304; for each receiver-transmitter pair generating a five dimensional S-parameter $s(x_t, y_t, x_r, y_r, k)$ 305; performing a four dimensional Fourier transform on the five dimensional S-parameter signal $s(x_t, y_t, x_r, y_r, k)$ 306; generating a five dimensional k-space signal 307, optionally selecting a subset of five dimensional k-space 308, mapping the five dimensional k-space signal to a three dimensional image k-space signal 309, performing an inverse Fourier transform 310 thereby generating the three dimensional image signal 311 which may be presented on a display device 312.

Figure 5B:
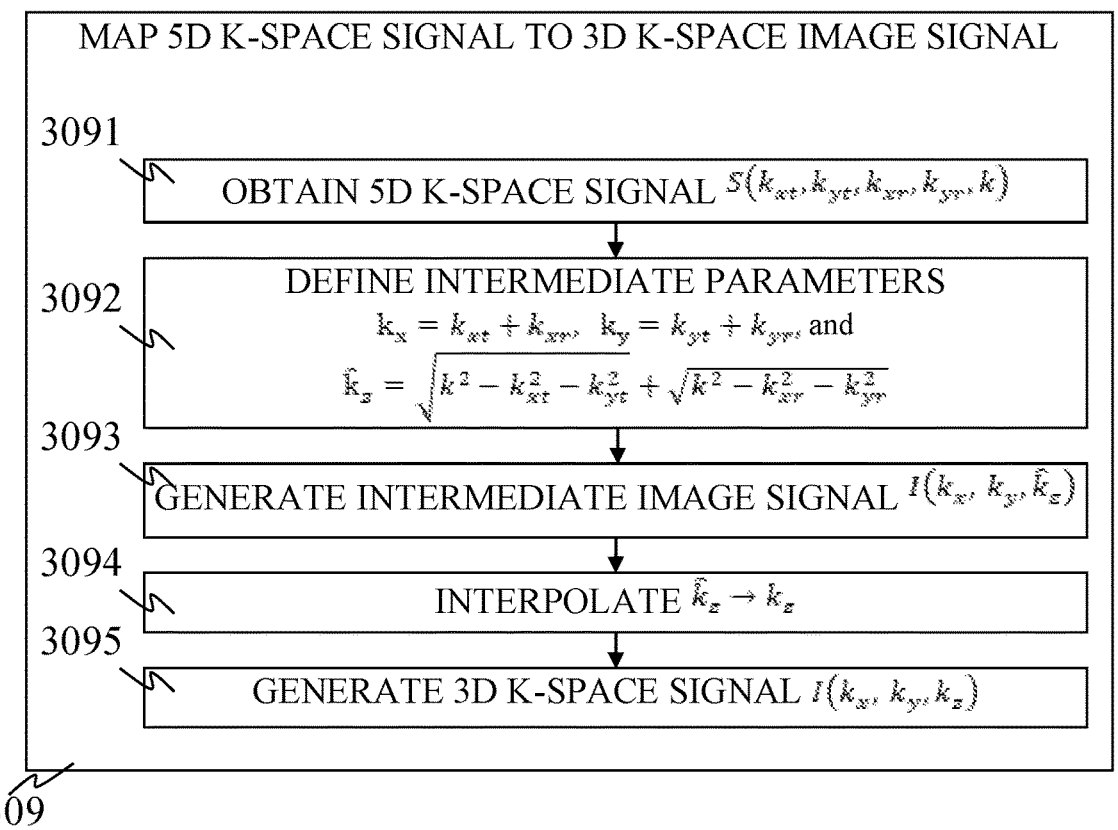
FIG. 5B is a flowchart detailing possible steps for mapping five dimensional antenna data into a three dimensional image data.
Figure 5C:
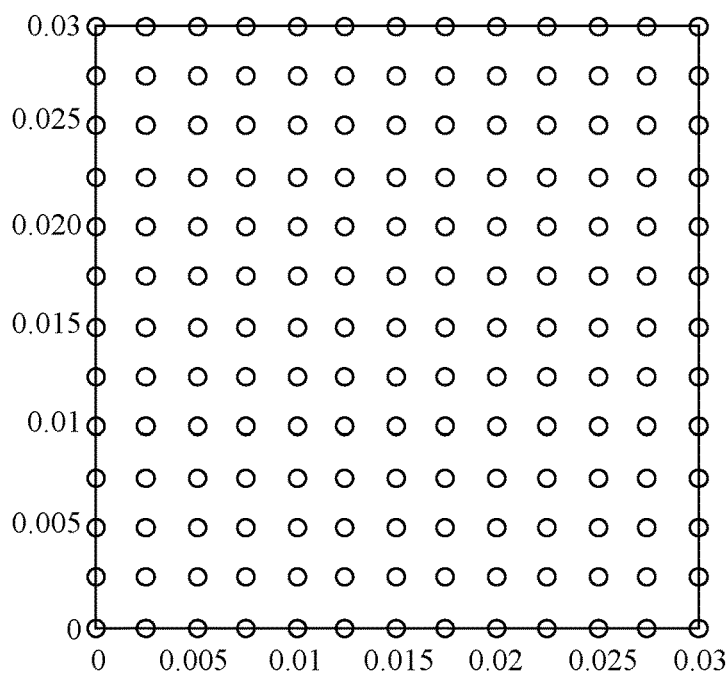
FIG. 5C indicates a possible arrangement of radar antennas in a uniform array.

Referring now to FIG. 5B, the step of mapping the five dimensional k-space signal to a three dimensional image k-space signal 309 may be achieved for a regular array such as represented by FIG. 5C, by obtaining the five dimensional k-space signal $S(k_{xt}, k_{yt}, k_{xr}, k_{yr}, k)$ 3091 and defining intermediate parameters $k_x$ and $k_y$, 3092 where:

$$k_x = k_{xt} + k_{xr}, k_y = k_{yt} + k_{yr} \text{ and } \hat{k}_z = \sqrt{k^2 - k_{xt}^2 - k_{yt}^2} + \sqrt{k^2 - k_{xr}^2 - k_{yr}^2}.$$

Accordingly, an intermediate image signal $I(k_x, k_y, \hat{k}_z)$ may be generated 3093, and, by interpolating $\hat{k}_z \rightarrow k_z$ 3094, a three dimensional k-space signal $I(k_x, k_y, k_z)$ may be generated 3095.

It is noted that for a small array such as shown in FIG. 5C, the implementation of the above method is appropriate as the number of transmitter-receiver pairs in the array is relatively small. However the number of transmitter-receiver pairs may result in an intermediate signal which is too large for the processor of the radar imaging system to generate the image signal in a reasonable amount of time.

Figure 6A:
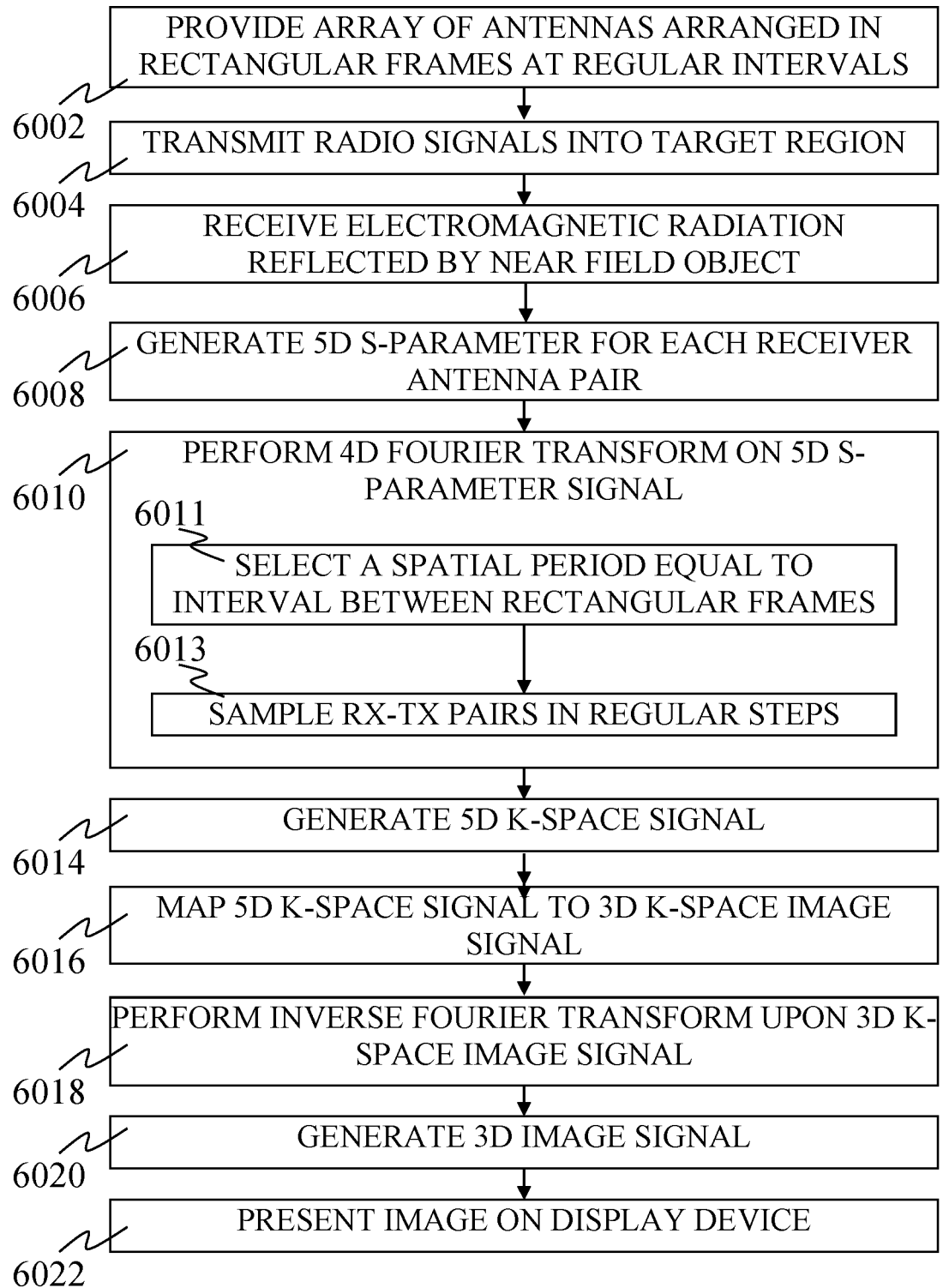
FIG. 6A is a flowchart indicating selected steps of a method for generating an image of an object in the near field from data collected by a radar antenna array arranged in regularly spaced rectangular frames.

Referring now to FIG. 6A a flowchart is presented showing selected steps of an improved method for generating an object in the near field from data collected by a radar antenna array arranged in regularly spaced rectangular frames such as represented in FIG. 6B. The method for regularly spaced rectangular frames includes providing an array of antennas arranged in rectangular frames at regular intervals 6002, each of the transmitting antennas transmitting a radio signal into a target region 6004; each of the receiving antennas receiving a radio signal reflected by an object within the target region 6006; for each receiver-transmitter pair generating a five dimensional S-parameter $s(x_t, y_t, x_r, y_r, k)$ 6008.

For example, each rectangular frame may include two parallel lines of equally spaced transmitters forming a first pair sides of a rectangle and two parallel lines of equally spaced receivers forming an orthogonal pair of sides of the rectangle.

As illustrated in FIG. 6C, a dense spacing a separates the antennas within the frame, whereas each frame itself has a sparse spacing width, La. For a six by six array of such frames it may be shown that size of the five dimensional S-parameter $S(x_t, y_t, x_r, y_r, k)$ generated is 6×180×180×6×101=117,806,400. However, using the method described above, the frames are assumed to be a regular array and the empty spaces in the array are considered antennas and are each assigned a zero-value for the purposes of the 4 dimensional Fourier transform. Consequently, the size of the five dimensional k-space signal S ($k_{xt}$, $k_{yt}$, $k_{xr}$, $k_{yr}$, k) is 296×296×296×296×101=775,332,909,056 which is a factor of almost 7,000 greater.

There is a need therefore for a more efficient and less data intensive method of recovering the image signal from the S-parameters in regularly spaced rectangular frames.

Accordingly, referring back to FIG. 6A, the improved method includes performing a four dimensional Fourier transform on the five dimensional S-parameter signal $s(x_t, y_t, x_r, y_r, k)$ 6010 by selecting a spatial period equal to the interval between rectangular frames 6011; and sampling the receiver-transmitter pairs in regular steps 6013.

The alternative sampling rate is illustrated in FIGS. 6D and 6E. The full four dimensional k-space, $S(k_{xs}, k_{yd}, k_{xd}, k_{ys}, k)$ may be obtained by periodic extension of the basic unit $S(k_{xs}^s, k_{yd}, k_{xd}, k_{ys}^s, k)$ in $k_{xs}$ and $k_{ys}$ dimensions.

Using this sampling rate it is no longer necessary to compute the full four dimensional k-space as the basic unit contains all the information. It may be shown that using this sampling rate the size of the five dimensional k-space signal $S(k_{xs}^s, k_{yd}, k_{xd}, k_{ys}^s, k)$ is 6×354×354×6×101=455,648,976 which is only a factor of four greater the S-parameter $S(x_t, y_t, x_r, y_r, k)$.

Thus using the improved method, the speed of calculation may be greatly increased, and the power of the processor and size of the memory unit may be correspondingly reduced.

Accordingly, less processing power is required to generate the five dimensional k-space signal 6014, map the five dimensional k-space signal to a three dimensional image k-space signal 6016, and perform the inverse Fourier transform 6018 to generate the three dimensional image signal 6020 to be presented on a display device 6022.

Figure 7:
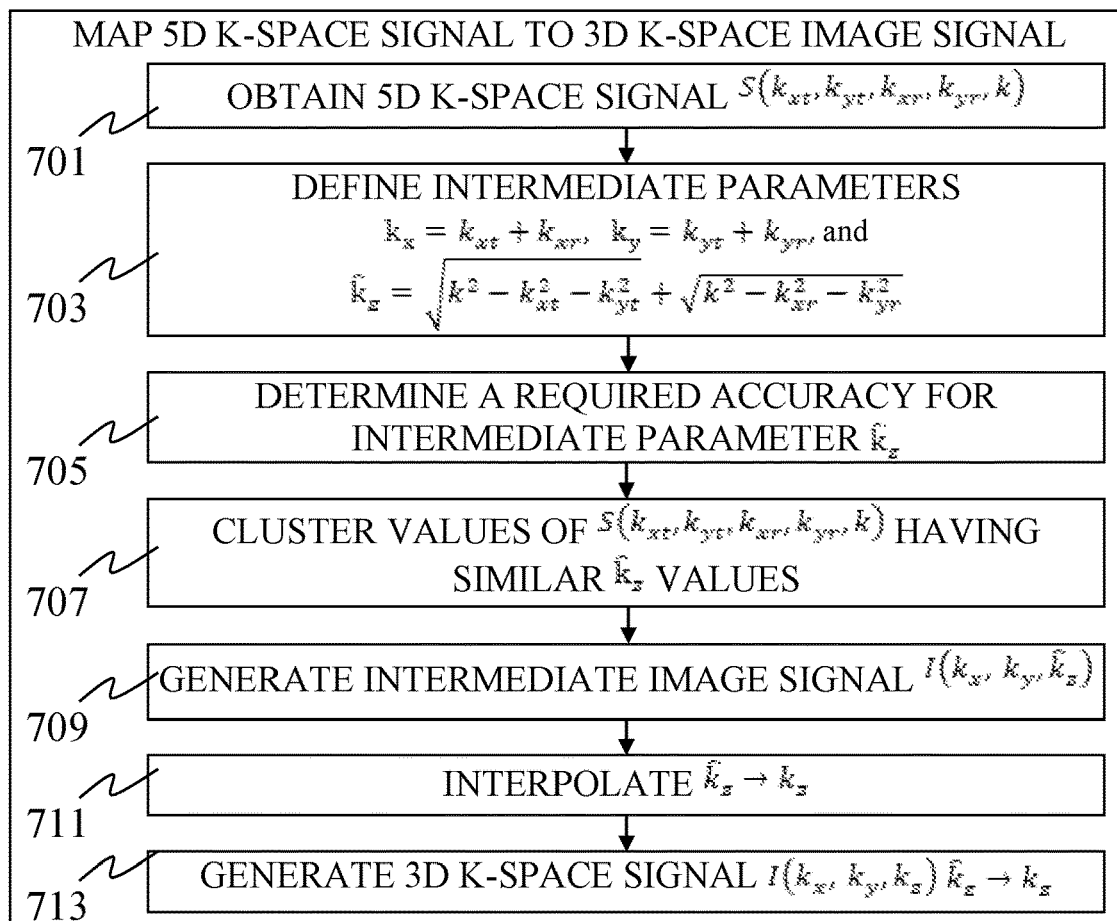
FIG. 7 is a flowchart detailing possible steps of an improved method for mapping five dimensional antenna data into a three dimensional image data wherein similar k values are clustered into bins thereby reducing the amount of data to be processed.

With reference now to the flowchart of FIG. 7, a method 700 is presented for mapping five dimensional antenna data into a three dimensional image data by clustering similar k values into bins so as to reduce the amount of data to be processed.

According to the method, the step of mapping the five dimensional k-space signal includes obtaining the five dimensional k-space signal $S(k_{xt}, k_{yt}, k_{xr}, k_{yr}, k)$ 701 and defining intermediate parameters kx and ky 703, where $$k_x = k_{xt} + k_{xr}, k_y = k_{yt} + k_{yr} \text{ and } \hat{k}_z = \sqrt{k^2 - k_{xt}^2 - k_{yt}^2} + \sqrt{k^2 - k_{xr}^2 - k_{yr}^2}.$$

The method further includes selecting a required accuracy for the $\hat{k}_z$ value 705 and clustering values of $S(k_{xt}, k_{yt}, k_{xr}, k_{yr}, k)$ into bins having the same $\hat{k}_z$ values 707. Accordingly, a quantized intermediate image signal $I(k_x, k_y, \hat{k}_z)$ may be generated 709, and, by interpolating the quantized value of $\hat{k}_z \to k_z$ 711, a three dimensional k-space signal $I(k_x, k_y, k_z)$ may be generated 713 with less processing power and memory.

Figure 8A:
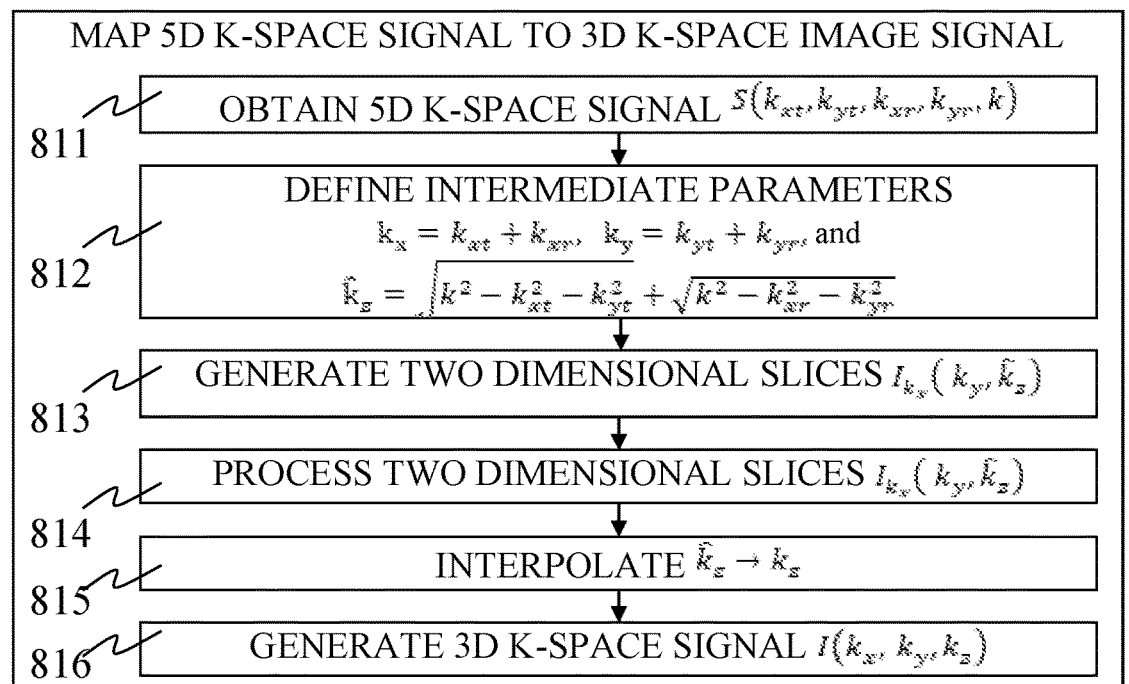
FIGS. 8A and 8B is a flowchart detailing possible steps of other improved method for mapping five dimensional antenna data into a three dimensional image data wherein slices of data are processed together thereby reducing the amount of data to be stored and processed.
Figures 8B, 8C:
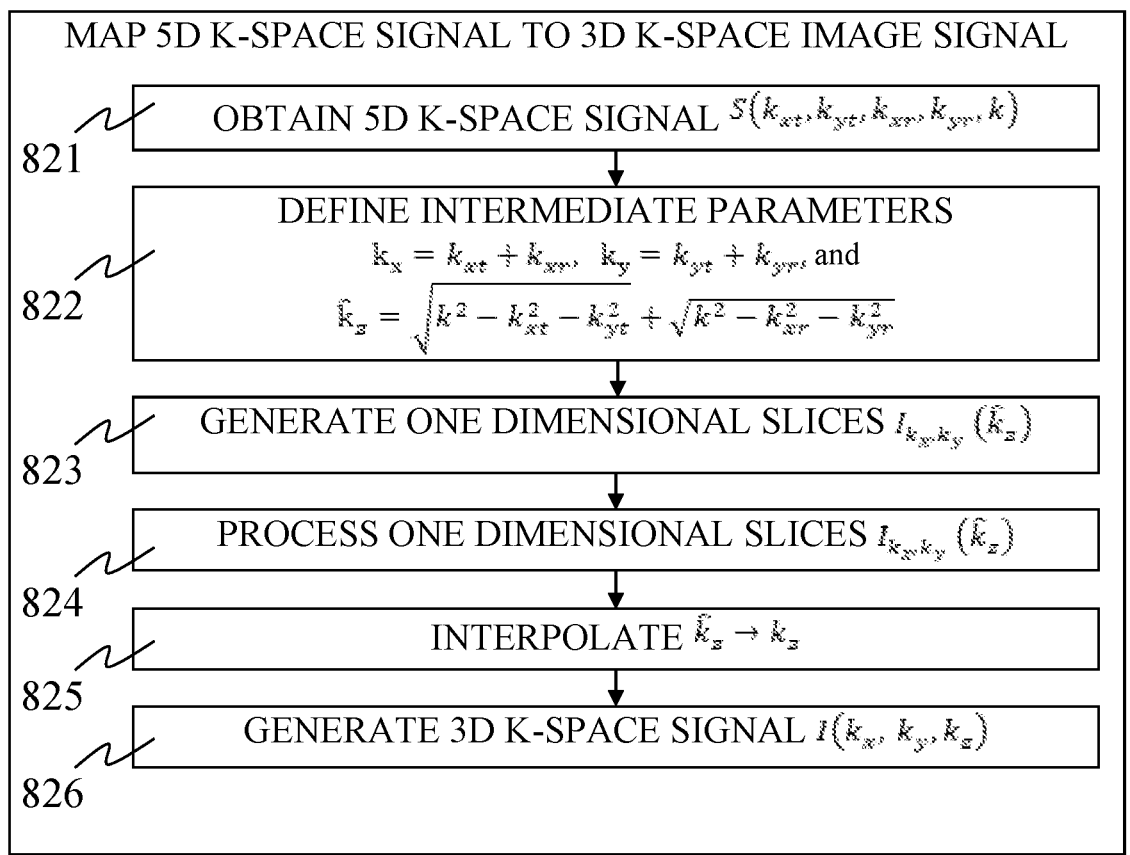
FIG. 8C illustrates an example of diagonally sliced data.

Referring now to the flowcharts of FIGS. 8A and 8B, methods 810, 820 are presented for mapping five dimensional antenna data into a three dimensional image data with reduced processing power by processing slices of data thereby reducing the amount of data to be processed.

With particular reference to FIG. 8A, the step of mapping the five dimensional k-space signal, according to the method, the step of mapping the five dimensional k-space signal 810 includes obtaining the five dimensional k-space signal $S(k_{xt}, k_{yt}, k_{xr}, k_{yr}, k)$ 811 and defining intermediate parameters kx and ky 812, where $$k_x = k_{xt} + k_{xr}, k_y = k_{yt} + k_{yr} \text{ and } \hat{k}_z = \sqrt{k^2 - k_{xt}^2 - k_{yt}^2} + \sqrt{k^2 - k_{xr}^2 - k_{yr}^2}.$$

Accordingly, an intermediate image signal $I(k_x, k_y, \hat{k}_z)$ may be generated 813 by processing two dimensional slices $I_{k_x}(k_y, \hat{k}_z)$ of the intermediate image signal $I(k_x, k_y, \hat{k}_z)$ 814 as illustrated in FIG. 8C. Thus, by interpolating the value of $\hat{k}_z \to k_z$ 815, a three dimensional k-space signal $I(k_x, k_y, k_z)$ may be generated 816 with less processing power and memory.

With particular reference now to FIG. 8B, the step of mapping the five dimensional k-space signal, according to the method, the step of mapping the five dimensional k-space signal 820 includes obtaining the five dimensional k-space signal $S(k_{xt}, k_{yt}, k_{xr}, k_{yr}, k)$ 821 and defining intermediate parameters kx and ky 822, where $$k_x = k_{xt} + k_{xr}, k_y = k_{yt} + k_{yr} \text{ and } \hat{k}_z = \sqrt{k^2 - k_{xt}^2 - k_{yt}^2} + \sqrt{k^2 - k_{xr}^2 - k_{yr}^2}.$$

Accordingly, an intermediate image signal $I(k_x, k_y, \hat{k}_z)$ may be generated 823 by processing one dimensional slices $I_{k_x, k_y}(\hat{k}_z)$ of the intermediate image signal $I(k_x, k_y, \hat{k}_z)$ 824. Thus, by interpolating the value of $\hat{k}_z \to k_z$ 825, a three dimensional k-space signal $I(k_x, k_y, k_z)$ may be generated 826 with less processing power and memory.

Referring back to FIG. 5A it is noted that in order to reduce the computational burden of a large five dimensional k-space, a subset of the k-space may be selected for mapping 308.

Figure 9B:
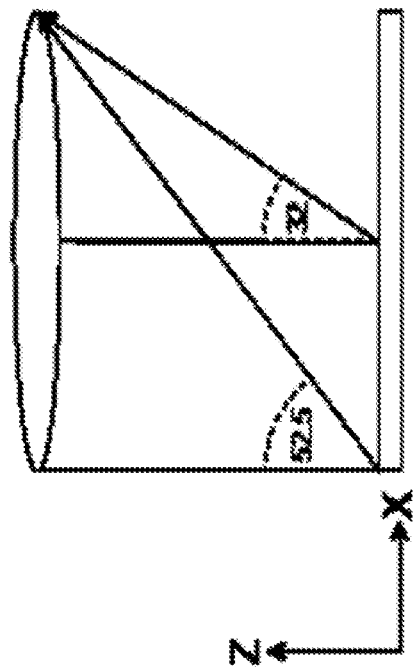
FIGS. 9A and 9B illustrate geometrical boundaries for selecting a subset of five dimensional k-space.

One method for selecting the required five dimensional k-space without losing information is to filter the data based upon the geometry of the system. For example, the diagrams of FIGS. 9A and 9B illustrate how geometrical boundaries may be used to select a subset of five dimensional k-space.

Figure 9A:
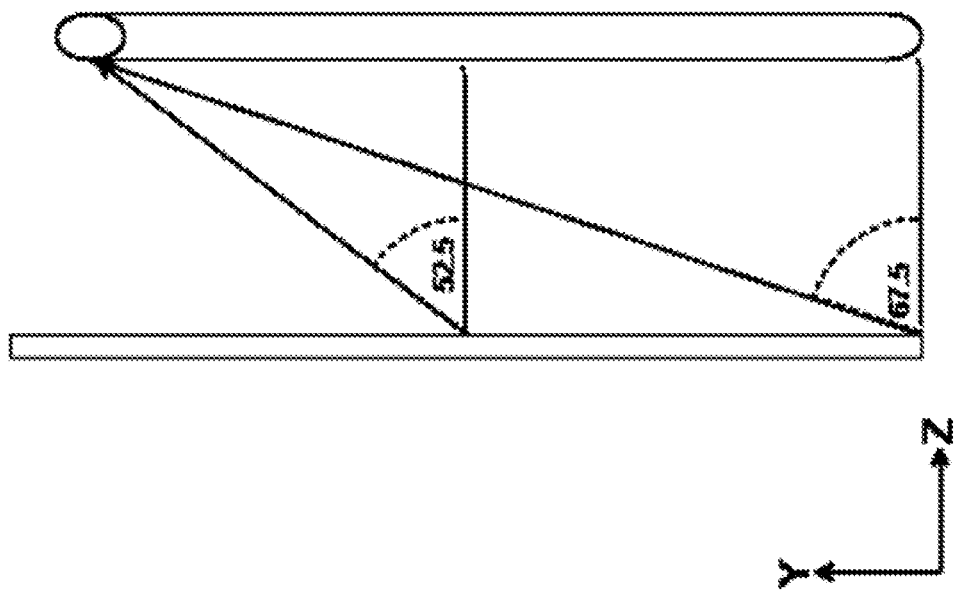

FIG. 9A represents the Y-Z plane in which the extreme end of an object subtends an angle of 52.5 degrees from a centrally positioned antenna of the array and an angle of 67.5 degrees from an edge antenna of the array. In the Y-Z plane, the bounds are given by $\phi = 90°$ such that $k_{y_{t/r}} = k \cdot \sin(\theta_{t/r})$. Accordingly, the limits of the $k_{y_{t/r}}/r$ are given by:

At the edge:

$$0 \leq k_{y_{\frac{t}{r}}} \leq 0.92 k_{max}$$

At the center:

$$-0.79 k_{max} \leq k_{y_{\frac{t}{r}}} \leq 0.79 k_{max}$$

Accordingly, any values of $k_{yt}/k_{yr}$ above 0.92 originate from energy originating outside the target area.

FIG. 9B represents the X-Z plane in which the extreme end of an object subtends an angle of 32 degrees from a centrally positioned antenna of the array and an angle of 52.5 degrees from an edge antenna of the array. In the X-Z plane, the bounds are given by $\phi = 0°$ such that $k_{x_{t/r}} = k \cdot \sin(\theta_{t/r})$. Accordingly, the limits of the $k_{y_{t/r}}/r$ are given by:

At the edge:

$$0 \leq k_{y_{\frac{t}{r}}} \leq 0.79 k_{max}$$

At the center:

$$-0.53 k_{max} \leq k_{y_{\frac{t}{r}}} \leq 0.53 k_{max}$$

Accordingly, any values of $k_{xt}/k_{xr}$ above 0.79 originate from energy originating outside the target area.

Another method for selecting the required five dimensional k-space without losing information is to filter the data based upon the radiation pattern of the transmitted energy. For example, the diagrams of FIGS. 9C and 9D illustrate possible radiation patterns in which it is noted that most energy is transmitted around a central band.

Figure 9C:
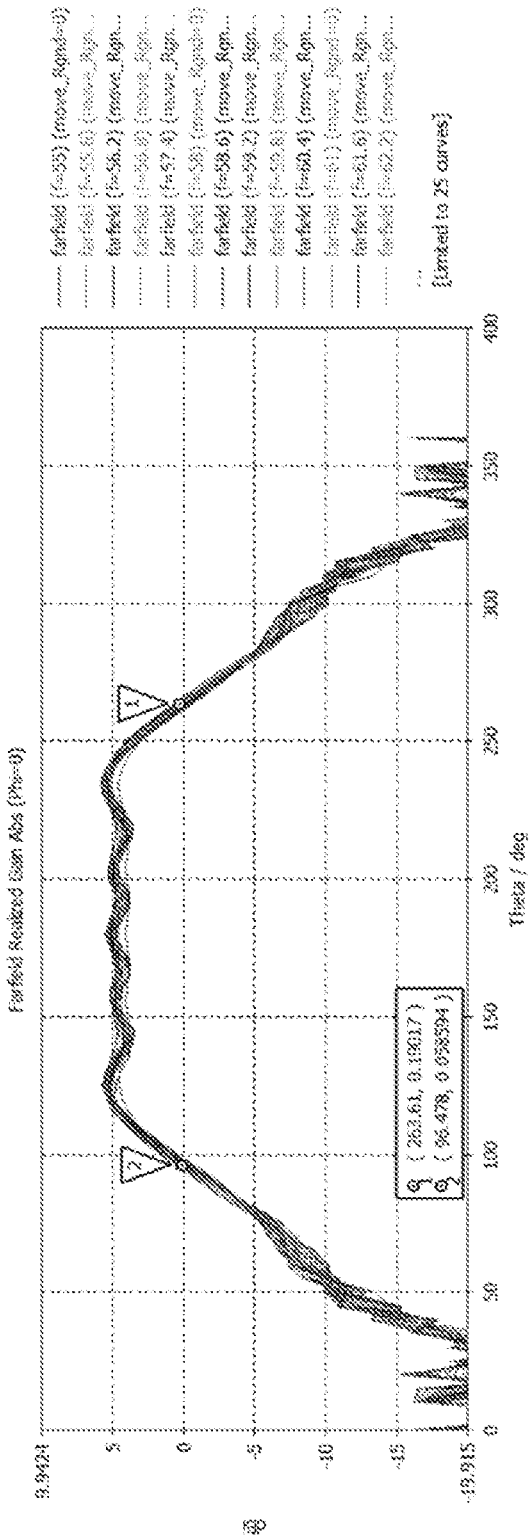
FIGS. 9C and 9D illustrate radiation boundaries for selecting a subset of five dimensional k-space.

FIG. 9C indicates the pattern along a cross section along the x-axis where $\phi=0°$. It is noted that the most energy is transmitted in a range of $-85° \leq \theta \leq 85°$.

Figure 9D:
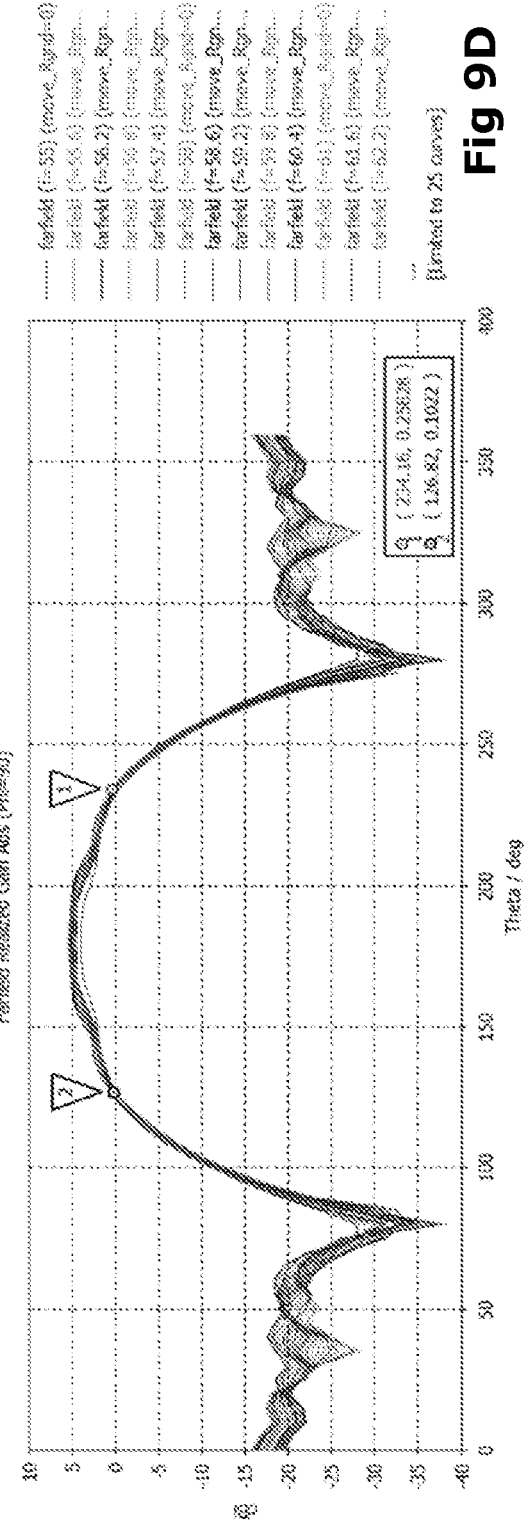

FIG. 9D indicates the pattern along a cross section along the y-axis where $\phi=90°$. It is noted that the most energy is transmitted in a range of $-54° \leq \theta \leq 54°$.

Accordingly, taken in combination, the geometrical boundaries and radiation patterns may define angular a limits $|\theta_x| \leq 52.5°$ and $|\theta_y| \leq 54°$.

Figure 9E:
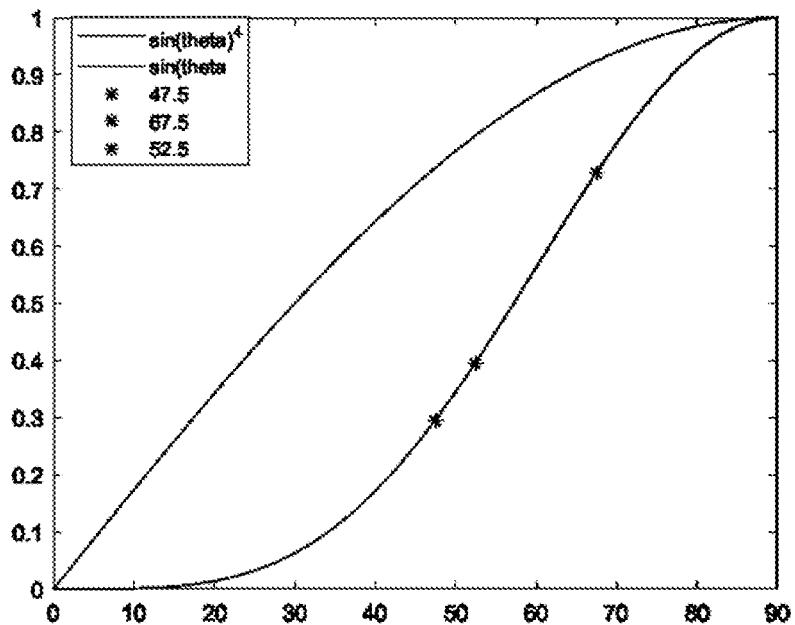
FIG. 9E is a graph indicating where various illumination angles may lie on a graph of (sine)4.

It is noted that the product of the sin values for each of these four angles serves to determine the values in k-space. Accordingly, FIG. 9E shows a graph indicating where various illumination angles may lie on a graph of $(sine)^4$ It is noted that a value of the extreme may be selected such that it lies as close as possible to the knee of this curve ie in the region of say 35-45 degrees.

In this manner the size of the five dimensional k-space is reduced and only the relevant subset of k-space may be mapped to the three dimensional k-space. Accordingly fewer calculations need to be processed. The number of DFT operations may be reduced by a factor of the product of $y_{factor}$ and $x_{factor}$. Moreover, the number of accumarray operations may be reduced by a factor of the products of the squares of $y_{factor}$ and $x_{factor}$. Removal of the unwanted energy also results in a cleaner final image.

Figure 10A:
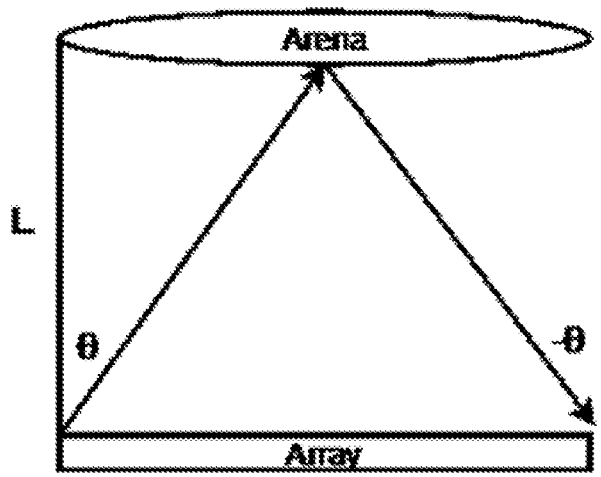
FIG. 10A illustrates the angles across the main diagonal of the array.
Figure 10B:
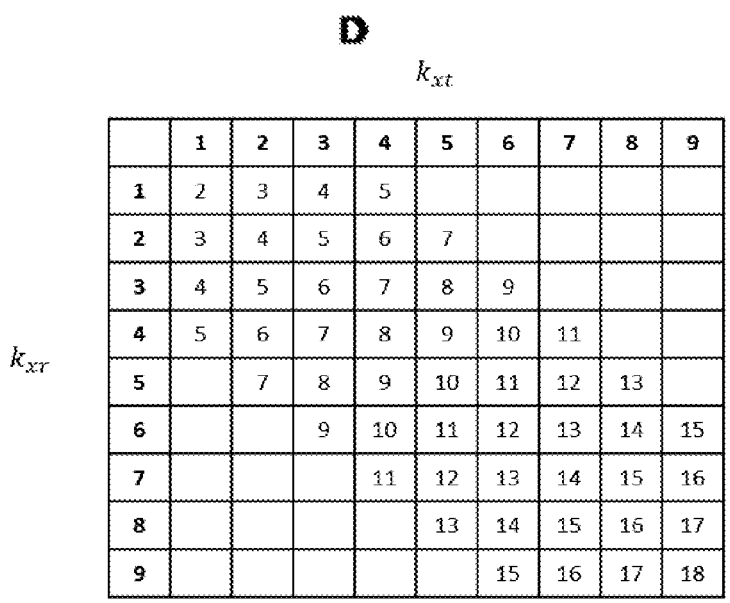
FIG. 10B illustrates a k-space matrix with values removed corresponding to angles exceed the limit of the main diagonal.

A further geometrical property which may be utilized to reduce the burden on computing power is the main diagonal of the array. Referring now to FIG. 10A, for a transmitted signal to be reflected from the arena of interest to back to the array the difference between the angle of transmission and reception must be below a threshold value $|\theta_t - \theta_r| \leq \theta_{diff}$ such that the corresponding difference between the k-numbers is $|k_{x_t} - k_{x_r}| \leq \alpha_x$. Accordingly, as illustrated in the matrix of FIG. 10B, the k-space may be limited by removing the extremes beyond threshold values given by:

$$k_{x_t} = -k_{x_r} = \pm \frac{a_x}{2}.$$

Figure 11A:
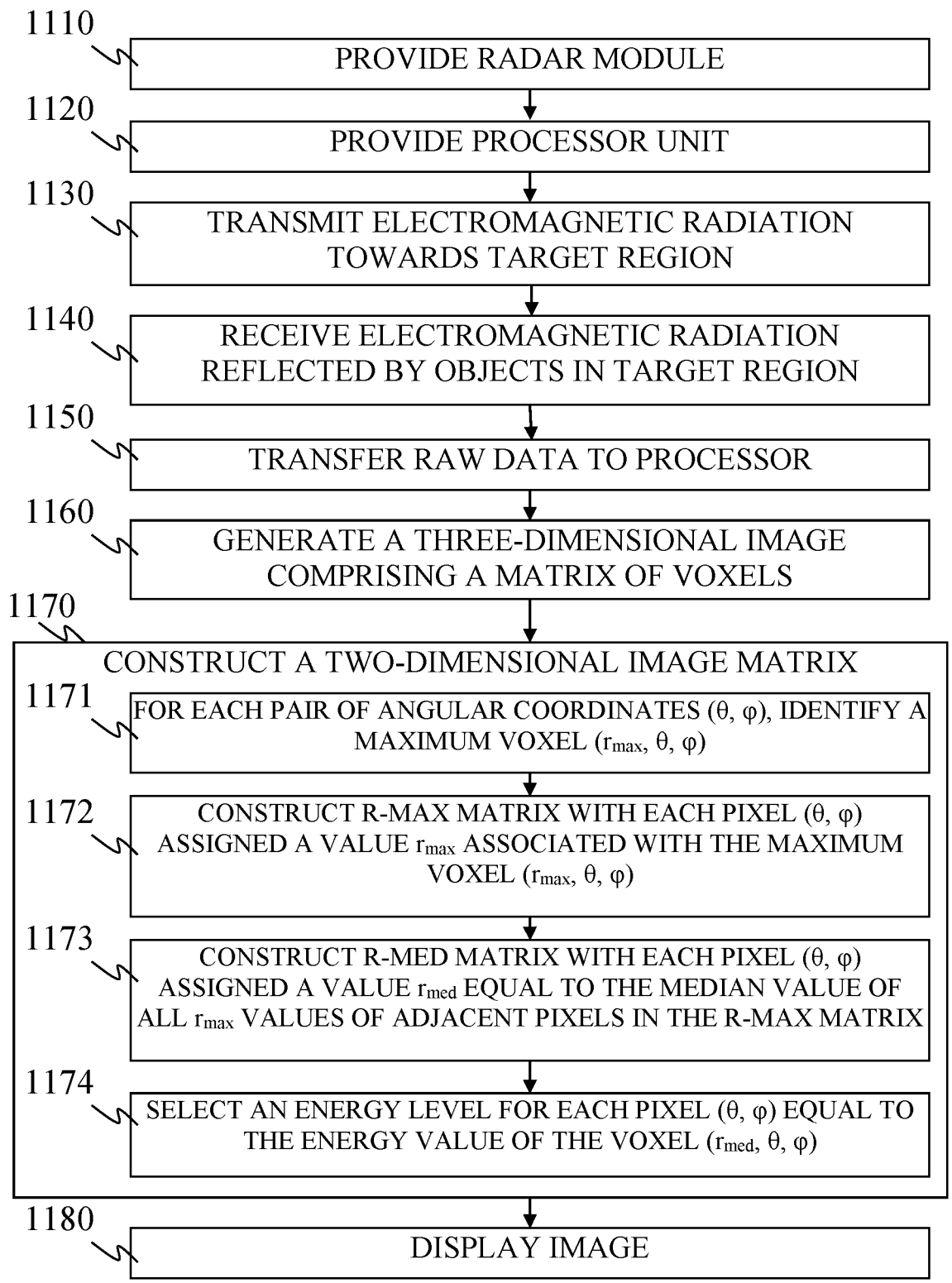
FIG. 11A is a block diagram illustrating selected steps of a method for generating a two dimensional image from radar data.
Figure 11B:
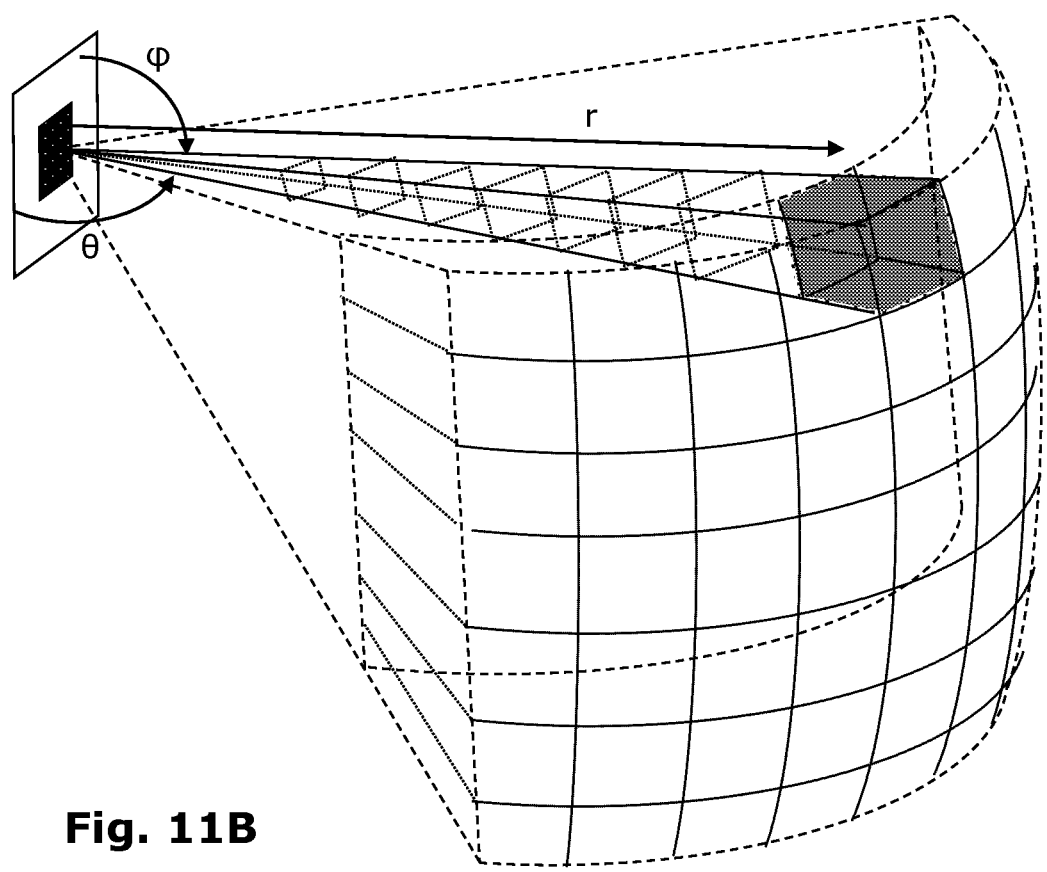
FIG. 11B illustrates a segment of a three dimensional image illustrating a selected voxel.

Referring now to the block diagram of FIG. 11A, another aspect of the disclosure is a method for generating a two dimensional image from radar data. The method includes the steps of providing a radar module 1110, providing a processor unit 1120, transmitting electromagnetic radiation towards a target region 1130, receiving electromagnetic radiation reflected by objects in the target region 1140 transferring the raw data to the processor 1150 and generating a three dimensional image of the target region 1160. As illustrated in FIG. 11B, the three dimensional image may comprise a three dimensional array of voxels, each voxel being characterized by a set of spherical coordinates (r, θ, φ) and an associated value of amplitude of energy reflected from those polar coordinates. For the purposes of illustration let the energy value of each voxel be given by the function E(r, θ, φ) where r is the radial distance r to the voxel from the radar, θ is the polar angle towards the voxel, and φ is the azimuthal angle towards the voxel.

The three dimensional image of the target region is reduced to a two dimensional image by constructing an image matrix comprising a two dimensional array of pixels 1170. Accordingly, a unique energy value E(θ, φ) is selected for each pixel characterized by a pair of angular coordinates (θ, φ).

The two dimensional image may be displayed upon a screen 1180.

It is noted that although a spherical coordinate system is described herein, equivalent methods may use other three dimensional coordinate systems, such as cylindrical coordinates (ρ, φ, z), cartesian coordinates (x, y, z) or the like.

Figure 11C:
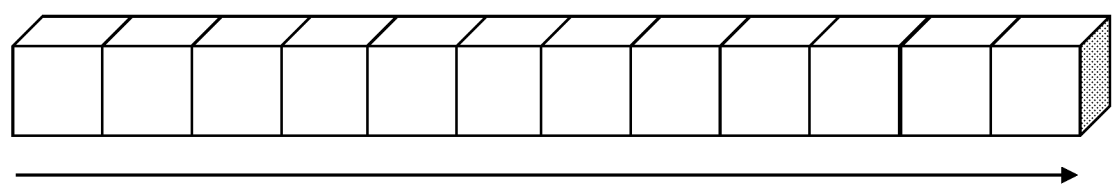
FIG. 11C illustrates a set of voxels sharing the same angular coordinates and having different r coordinates.

FIG. 11C illustrates a set of voxels sharing the same angular coordinates and having different r coordinates. In some embodiments, a basic energy value selection method may be used in which each pixel is assigned the highest value of E (r, θ, φ) for the associated pair of angular coordinates (θ, φ) regardless of the value of r. However this has been found to be surprisingly inefficient as it does not produce sharp boundaries between different objects in the image.

Rather, in order for objects to be readily identifiable in the displayed two dimensional image, a more sophisticated approach has been discovered, wherein the energy value associated with a particular value of r is assigned. One such method 1170, which has been found to produce sharp boundaries includes the following substeps.

For each pair of angular coordinates (θ, φ), identifying the maximum voxel 1171 with the highest value of E (r, θ, φ) the r value of this voxel is denoted $r_{max}$. A two dimensional r-max matrix is then constructed in which each cell is assigned the value rmax associated with the maximum voxel 1172.

Having constructed the r-max matrix it is used to construct a new two dimensional matrix known as the r-med matrix, in which each cell is assigned a new r value $r_{med}$ which is equal to the median value of all rmax values of adjacent cell in the r-max matrix 1173.

By way of example reference is made to an illustrative r-max matrix as shown FIG. 12A. Consider the cell located at the fourth row and fourth column. This cell is assigned a value of rmax44. The eight adjacent cells have values of $r_{max}33$, $r_{max}34$, $r_{max}35$, $r_{max}43$, $r_{max}45$, $r_{max}53$, $r_{max}54$ and $r_{max}55$.

Accordingly, the corresponding cell of the r-med matrix as shown in FIG. 12B, is assigned the median value $r_{med}44$ which is selected from the set of values: ($r_{max}33$, $r_{max}34$, $r_{max}35$, $r_{max}43$, $r_{max}45$, $r_{max}53$, $r_{max}54$, $r_{max}55$).

The r-med matrix may be used to select energy values for each pixel (θ, φ) of the two-dimensional image 1174 corresponding to the energy level E($r_{med}$, θ, φ) of the voxel having the coordinates ($r_{med}$, θ, φ).

Figure 13:
FIG. 13 is an example of a two dimensional image showing objects in the target region.

FIG. 13 is an example of a two dimensional image produced using the above method. It will be appreciated that the objects in the image have sharp boundaries rendering them easy to differentiate and to identify.

It is appreciated that certain features of the invention, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

Although the invention has been described in conjunction with specific embodiments thereof, it is evident that other alternatives, modifications, variations and equivalents will be apparent to those skilled in the art. Accordingly, it is intended to embrace all such alternatives, modifications, variations and equivalents that fall within the spirit of the invention and the broad scope of the appended claims. Additionally, the various embodiments set forth hereinabove are described in terms of exemplary block diagrams, flow charts and other illustrations. As will be apparent to those of ordinary skill in the art, the illustrated embodiments and their various alternatives may be implemented without confinement to the illustrated examples. For example, a block diagram and the accompanying description should not be construed as mandating a particular architecture, layout or configuration.

In various embodiments of the disclosure, one or more tasks as described herein may be performed by a data processor, such as a computing platform or distributed computing system for executing a plurality of instructions. Optionally, the data processor includes or accesses a volatile memory for storing instructions, data or the like. Additionally, or alternatively, the data processor may access a non-volatile storage, for example, a magnetic hard-disk, flash-drive, removable media or the like, for storing instructions and/or data.

It is particularly noted that the systems and methods of the disclosure herein may not be limited in its application to the details of construction and the arrangement of the components or methods set forth in the description or illustrated in the drawings and examples. The systems and methods of the disclosure may be capable of other embodiments, or of being practiced and carried out in various ways and technologies.

Alternative methods and materials similar or equivalent to those described herein may be used in the practice or testing of embodiments of the disclosure. Nevertheless, particular methods and materials are described herein for illustrative purposes only. The materials, methods, and examples are not intended to be necessarily limiting.

Technical Notes

Technical and scientific terms used herein should have the same meaning as commonly understood by one of ordinary skill in the art to which the disclosure pertains. Nevertheless, it is expected that during the life of a patent maturing from this application many relevant systems and methods will be developed. Accordingly, the scope of the terms such as computing unit, network, display, memory, server and the like are intended to include all such new technologies a priori.

As used herein the term "about" refers to at least ±10%.

The terms "comprises", "comprising", "includes", "including", "having" and their conjugates mean "including but not limited to" and indicate that the components listed are included, but not generally to the exclusion of other components. Such terms encompass the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" may include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. It should be understood, therefore, that the description in range format is merely for convenience and brevity and should not be construed as an inflexible limitation on the scope of the disclosure. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6 as well as non-integral intermediate values. This applies regardless of the breadth of the range.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

The scope of the disclosed subject matter is defined by the appended claims and includes both combinations and sub combinations of the various features described hereinabove as well as variations and modifications thereof, which would occur to persons skilled in the art upon reading the foregoing description.

The invention claimed is:

1. The method for generating a radar image of an object at close range from a two dimensional array of antennas, the method comprising:
providing a display device;
providing an array of transmitting antennas and receiving antennas arranged in a matrix of rectangular frames spaced at regular intervals;
each of said transmitting antennas transmitting a radio signal into a target region;
each of said receiving antennas receiving a radio signal reflected by an object within the target region; and
generating image data by:
for each receiver-transmitter pair generating a five dimensional S-parameter $s(x_t, y_t, x_r, y_r, k)$;
performing a four dimensional Fourier transform on the five dimensional S-parameter signal $s(x_t, y_t, x_r, y_r, k)$, thereby generating a five dimensional k-space signal $S(k_{xt}, k_{yt}, k_{xr}, k_{yr}, k)$;
mapping the five dimensional k-space signal $S(k_{xt}, k_{yt}, k_{xr}, k_{yr}, k)$ to a three dimensional image k-space signal $I(k_x, k_y, k_z)$;
performing an inverse Fourier transform thereby generating the image signal $I(x, y, z)$; and
adjusting the display device to represent the image signal.

2. The method of claim 1 further comprising recording the scanning device's own location thereby providing a reference position for antennas transmitting signals are receiving reflected signals are received.

3. The method of claim 2 further comprising triangulating the location of the radar unit.

4. The method of claim 1 further comprising:
providing a radar unit comprising at least one transmitter antenna connected to an oscillator and at least one receiver antenna;
providing a movable casing unit encasing the radar unit;
passing the movable casing unit over the target region.

5. The method of claim 1 wherein the step of performing a four dimensional Fourier transform on the five dimensional S-parameter signal comprises:
selecting a spatial period equal to the interval between rectangular frames; and
sampling the RX-TX pairs in regular steps.

6. The method of claim 1 wherein each rectangular frame comprises two parallel lines of equally spaced transmitters forming a first pair sides of a rectangle and two parallel lines of equally spaced receivers forming an orthogonal pair of sides of the rectangle.

7. The method of claim 1 wherein the step of mapping the five dimensional k-space signal further comprises:
generating an intermediate image signal $I(k_x, k_y, \hat{k}_z)$ wherein:

$k_x = k_{xt} + k_{xr}, k_y = k_{yt} + k_{yr}$, and $\hat{k}_z = \sqrt{k^2 - k_{xt}^2 - k_{yt}^2} + \sqrt{k^2 - k_{xr}^2 - k_{yr}^2}$; and interpolating $\hat{k}_z \rightarrow k_z$.

8. The method of claim 1 wherein the step of mapping the five dimensional k-space signal further comprises:
selecting a required accuracy for the $\hat{k}_z$ value; and
clustering values of $S(k_{xt}, k_{yt}, k_{xr}, k_{yr}, k)$ into bins having the same $\hat{k}_z$ values.

9. The method of claim 1 wherein the step of mapping the five dimensional k-space signal further comprises:
processing two dimensional slices $I_{k_x}(k_y, \hat{k}_z)$ of the intermediate image signal $I(k_x, k_y, \hat{k}_z)$.

10. The method of claim 1 wherein the step of mapping the five dimensional k-space signal further comprises:
processing one dimensional slices $I_{k_x,k_y}(\hat{k}_z)$ of the intermediate image signal $I(k_x, k_y, \hat{k}_z)$.

11. The method of claim 1 wherein the step of generating image data comprises:
generating a three dimensional image of the target region comprising a three dimensional array of voxels, each voxel being characterized by a first coordinate, a second coordinate, a third coordinate and an associated value of amplitude of energy reflected from those coordinates;
constructing an image matrix comprising a two dimensional array of pixels by selecting a unique energy value for each pixel characterized by the first coordinate, and the second coordinate by:
for each pair of first coordinate and second coordinate, identifying a maximum voxel with an energy value higher than all other voxels sharing the same pair of first coordinate and second coordinate;
constructing a two dimensional max-voxel matrix wherein each cell is characterized by a pair of first coordinate and second coordinate and assigned a value associated with the third coordinate of the maximum voxel for that pair;
constructing a two dimensional med-value matrix wherein each cell is characterized by a pair of first coordinate and second coordinate and assigned a value equal to the median of all values of cells adjacent to the corresponding cell in the max-voxel matrix;
selecting an energy level for each pixel of the image matrix which is equal to the energy value of the voxel characterized by:
the first coordinate of the pixel,
the second coordinate of the pixel, and
the third coordinate equal to the value of the corresponding cell in the med-value matrix.

12. The method of claim 11 wherein the first coordinate, the second coordinate and the third coordinate comprise a set of cartesian coordinates (x, y, z).

13. The method of claim 11 wherein the first coordinate, the second coordinate and the third coordinate comprise a set of cylindrical coordinates (ρ, φ, z).

14. The method of claim 11 wherein the first coordinate, the second coordinate and the third coordinate comprise a set of spherical coordinates (r, θ, φ).

15. A scanning device for imaging a surface within a target region, the device comprising:
a radar unit comprising:
an array of transmitting antennas and receiving antennas arranged in a matrix of rectangular frames spaced at regular intervals;

an oscillator connected to said transmitting antennas;

a processor unit configured to receive raw data from the radar unit and operable to generate image data based upon the raw data by:

for each receiver-transmitter pair generating a five dimensional S-parameter $s(x_t, y_t, x_r, y_r, k)$;

performing a four dimensional Fourier transform on the five dimensional S-parameter signal $s(x_t, y_t, x_r, y_r, k)$, thereby generating a five dimensional k-space signal $S(k_{xt}, k_{yt}, k_{xr}, k_{yr}, k)$;

mapping the five dimensional k-space signal $S(k_{xt}, k_{yt}, k_{xr}, k_{yr}, k)$ to a three dimensional image k-space signal $I(k_x, k_y, k_g)$;

performing an inverse Fourier transform thereby generating the image signal $I(x, y, z)$; and a memory unit configured and operable to store the image data;

a display configured and operable to display an image representing the surface.

16. The scanning device of claim 15 wherein said radar unit is encased within a movable casing unit.

17. The scanning device of claim 16 wherein the movable casing unit has dimensions suitable for use as a hand-held scanner.

18. The scanning device of claim 15 further comprising a registration mechanism configured and operable to record the scanning device's own location thereby providing a reference position for antennas transmitting signals are receiving reflected signals are received.

19. The scanning device of claim 18 wherein the registration mechanism comprises a set of fixed reference beacons.

20. The scanning device of claim 19 wherein the processor unit is operable to triangulate the location of the radar unit.

\* \* \* \* \*